United States Patent
Zhao et al.

(10) Patent No.: US 10,505,601 B2
(45) Date of Patent: Dec. 10, 2019

(54) METHOD AND DEVICE FOR FEEDING BACK CHANNEL STATE INFORMATION IN MULTI-INPUT MULTI-OUTPUT SYSTEM

(71) Applicant: XI'AN ZHONGXING NEW SOFTWARE CO., LTD, Shaanxi (CN)

(72) Inventors: Jing Zhao, Shenzhen (CN); Yijian Chen, Shenzhen (CN); Yu Ngok Li, Shenzhen (CN); Jian Li, Shenzhen (CN); Huahua Xiao, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 23 days.

(21) Appl. No.: 15/565,200

(22) PCT Filed: Sep. 24, 2015

(86) PCT No.: PCT/CN2015/090548
§ 371 (c)(1),
(2) Date: Apr. 3, 2018

(87) PCT Pub. No.: WO2016/161779
PCT Pub. Date: Oct. 13, 2016

(65) Prior Publication Data
US 2018/0212656 A1 Jul. 26, 2018

(30) Foreign Application Priority Data
Apr. 8, 2015 (CN) .......................... 2015 1 0163233

(51) Int. Cl.
*H04B 7/06* (2006.01)
*H04B 7/0456* (2017.01)
*H04L 1/06* (2006.01)

(52) U.S. Cl.
CPC .......... *H04B 7/0473* (2013.01); *H04B 7/0478* (2013.01); *H04B 7/0626* (2013.01); *H04L 1/06* (2013.01)

(58) Field of Classification Search
CPC .. H04B 7/0473; H04B 7/0478; H04B 7/0626; H04L 1/06
See application file for complete search history.

(56) References Cited

U.S. PATENT DOCUMENTS

| | | | |
|---|---|---|---|
| 2007/0191066 A1 | 8/2007 | Khojastepour | |
| 2009/0274227 A1 | 11/2009 | Kim | |

(Continued)

FOREIGN PATENT DOCUMENTS

| | | |
|---|---|---|
| CN | 101667896 A | 3/2010 |
| CN | 102082653 A | 6/2011 |

(Continued)

OTHER PUBLICATIONS

International Search Report for corresponding application PCT/CN2015/090548 filed Sep. 4, 2017; dated Jan. 12, 2016.

(Continued)

*Primary Examiner* — Kenneth T Lam
(74) *Attorney, Agent, or Firm* — Cantor Colburn LLP

(57) ABSTRACT

A method and device for feeding back Channel State Information (CSI) in a multi-input multi-output system are provided. In the method, User Equipment (UE) feeds back CSI comprising codebook index information to an evolved Node B (eNodeB). The codebook index information may include a first type of codebook index set I and a second type of codebook index set J, where a combination of the first type of index set I and the second type of index set J is used for indicating a precoding matrix U, and the precoding matrix U is an $N_t \times r$ matrix and is composed of at least $Q \times r$ basic vectors having a dimension of $N_t/Q$. The basic vectors are (Continued)

---

101 A UE obtains CSI

102 The UE feeds back CSI including codebook index information to an eNodeB columns extracted from a matrix B composed of M columns of $N_t/Q$-dimensional vectors.

20 Claims, 1 Drawing Sheet

(56) References Cited

U.S. PATENT DOCUMENTS

| | | | | |
|---|---|---|---|---|
| 2012/0076028 | A1* | 3/2012 | Ko | H04L 1/0026 370/252 |
| 2012/0322392 | A1* | 12/2012 | Yokomakura | H04L 27/2636 455/73 |
| 2013/0064273 | A1* | 3/2013 | Tosato | H03M 7/3082 375/219 |
| 2013/0077660 | A1* | 3/2013 | Ko | H04B 7/0639 375/219 |
| 2014/0177744 | A1 | 6/2014 | Krishnamurthy et al. | |
| 2016/0197657 | A1* | 7/2016 | Ko | H04L 1/0026 370/329 |
| 2016/0330004 | A1* | 11/2016 | Kim | H04L 5/0048 |
| 2017/0289979 | A1* | 10/2017 | Xu | H04L 1/06 |

FOREIGN PATENT DOCUMENTS

| | | |
|---|---|---|
| CN | 104348575 A | 2/2015 |
| EP | 2665203 A1 | 11/2013 |
| WO | 2014137203 A2 | 9/2014 |

OTHER PUBLICATIONS

Ericsson et al. "Codebook subsampling for PUCCH mode 1-1, submode 2", 3rd Generation Partnership Project (3GPP), Mobile Competence Cnetre, Aug. 9, 2013, vol. RAN WG1, No. Barcelona, Spain, Aug. 19, 2013-Aug. 23, 2013, p. 1.

Extended European Search Report dated Apr. 16, 2018 re: Application No. 15888331.4-1220/3282617 PCT/CN2015/090548, pp. 1-10, citing: US 2014/177744 A1, EP 2 665 203 A1, WO 2014/137203 A2, Huawei et al. "Remaining details . . . " and Ericsson et al. "Codebook subsampling . . . ".

Huawei et al. "Remaining details of codebook subsampling", 3GPP Draft; R1-133510, 3rd Generation Partnership Project (3GPP), Mobile Competence Centre, Aug. 10, 2013, vol. RAN WG1, No. Barcelona, Spain Aug. 19, 2013-Aug. 23, 2013, pp. 1-8.

\* cited by examiner

METHOD AND DEVICE FOR FEEDING BACK CHANNEL STATE INFORMATION IN MULTI-INPUT MULTI-OUTPUT SYSTEM

TECHNICAL FIELD

The present disclosure relates to but not limited to the field of communications.

BACKGROUND

In a wireless communication system, a transmitter and a receiver may obtain a higher rate of data transmission by adopting multiple antennas in a spatial multiplexing manner. With respect to a common spatial multiplexing method, an enhancement technology, in which a receiver may feed back channel information to a transmitter and the transmitter may employ some transmission precoding technologies according to the obtained channel information, may be adopted to greatly improve the transmission performance. In a single-user Multi-input Multi-output (MIMO), channel characteristic vector information may be directly used for precoding. In a multi-user MIMO, more accurate channel information may be needed.

In a Long Term Evolution (LTE) plan, channel information is mainly fed back using a relatively simple feedback method with a single codebook. The performance of the transmission precoding technology of the MIMO may be more reliant on the accuracy of codebook feedback.

Here, a basic principle of channel information quantized feedback based on the codebook is briefly described as follows.

It is assumed that the capacity of a limited feedback channel is B bps/Hz, then the number of available code words may be $N=2^B$. A characteristic vector space of a channel matrix may be quantized to form a codebook space $\Re = \{F_1, F_2 L F_N\}$. The transmitter and the receiver may both store the codebook or generate the codebook in real time. Herein, the codebook at the transmitter and the receiver is the same. According to the channel matrix H obtained by the receiver, the receiver may select a code word $\hat{F}$ most matched with the channel from the codebook space $\Re$ according to a certain criterion and may feed a code word serial number i back to the transmitter. Here, the code word serial number is called as a Precoding Matrix Indicator (PMI). The transmitter may find a corresponding precoding code word $\hat{F}$ according to the code word serial number i, thereby obtaining the channel information. The precoding code word $\hat{F}$ represents the characteristic vector information of the channel.

Generally speaking, the codebook space $\Re$ may further be divided into codebooks corresponding to multiple ranks. Under each rank, there may be multiple corresponding code words to quantize the precoding matrix formed by channel characteristic vectors under this rank. The number of the ranks of the channel is the same as that of nonzero characteristic vectors, so in general, when the number of ranks is N, the number of columns in each code word is N. Hence, the codebook $\Re$ may be divided into multiple sub-codebooks in terms of different ranks, as shown in a Table A1.

TABLE A1

| $\Re$ | | | |
|---|---|---|---|
| Number of layers υ (Rank) | | | |
| 1 | 2 | ... | N |
| $\Re_1$ A set of code word vectors having one column | $\Re_2$ A set of code word vectors having two columns | ... | $\Re_N$ A set of code word vectors having N columns |

In the table, $\Re_1$ represents a set of code word vectors having one column, $\Re_2$ represents a set of code word vectors having two columns, and $\Re_N$ represents a set of code word vectors having N columns.

Herein, when Rank>1, the code words needing to be stored are all in a matrix form. In an LTE protocol, the codebook is fed back by this quantized codebook feedback method. The codebook for downlink four transmitting antennas in an LTE Rel-8 version is as shown in a Table A2. As a matter of fact, the precoding codebook and the channel information quantized codebook in the LTE may have the same meaning. Hereinafter, for simplicity, a vector may also be regarded as a one-dimensional matrix.

TABLE A2

| Code word index $u_n$ | | Total number of layers υ (RI) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE A2-continued

| Code word index $u_n$ | Total number of layers υ (RI) | | | |
|---|---|---|---|---|
| | 1 | 2 | 3 | 4 |
| 14  $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/\sqrt{2}$ |
| 15  $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/\sqrt{2}$ |

Herein, $W_n = I - 2u_n u_n^H / u_n^H u_n$, I is a unit matrix, $W_k^{(j)}$ represents a $j^{th}$ column vector of a matrix $W_k^{(j)}$. $W_k^{(j_1, j_2, \cdots, j_n)}$ represents a matrix formed by $j_1, j_2, \ldots, j_n^{th}$ columns of the matrix $W_k$.

The code words under rank 1 for Rel-10 LTE downlink 8Tx are as shown in a Table A3, and the codebook under rank 2 is as shown in a Table A4.

TABLE A3

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n v_m \end{bmatrix}$

TABLE A4

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| | $i_2$ | | | |
|---|---|---|---|---|
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

TABLE A4-continued

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_n v_m & -\varphi_n v_{m'} \end{bmatrix}$ Where:

$\varphi_n = e^{j\pi n/2}$ $v_m = [1\ e^{j2\pi m/32}\ e^{j4\pi m/32}\ e^{j6\pi m/32}]^T$ \hfill (1)

Table A5 to Table A10 respectively show the codebook under ranks 3 to 8 for the 8Tx.

TABLE A5

| | $i_2$ | | | |
|---|---|---|---|---|
| $i_1$ | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| | $i_2$ | | | |
|---|---|---|---|---|
| $i_1$ | 4 | 5 | 6 | 7 |
| 0-3 | $8_{i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

TABLE A5-continued

| | $i_2$ | | | |
|---|---|---|---|---|
| $i_1$ | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| | $i_2$ | | | |
|---|---|---|---|---|
| $i_1$ | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$

TABLE A6

| | $i_2$ | | | |
|---|---|---|---|---|
| $i_1$ | 0 | 1 | 2 | 3 |
| 0-3 | $W_{8i_1,8i_1,+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE A7

| | $i_2$ |
|---|---|
| $i_1$ | 0 |
| 0-3 | $W_{i_1}^{(5)} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE A8

| | $i_2$ |
|---|---|
| $i_1$ | 0 |
| 0-3 | $W_{i_1}^{(6)} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE A9

| | $i_2$ |
|---|---|
| $i_1$ | 0 |
| 0-3 | $W_{i_1}^{(7)} = \frac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE A10

| | $i_2$ |
|---|---|
| $i_1$ | 0 |
| 0 | $W_{i_1}^{(8)} = \frac{1}{8}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

The codebook for 8Tx is designed using a combination of Discrete Fourier Transformation (DFT) vectors and therefore is more suitable for correlated channels. In Rel 12, an enhanced design is adopted by the codebooks for the 4Tx. Specifically, the codebooks under ranks 1 to 2 are changed, and the codebooks under ranks 3 to 4 are maintained. The enhanced codebooks for the 4Tx are as shown in Table A11 and Table A12.

TABLE A11

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v'_m \\ \varphi'_n v'_m \end{bmatrix}$

TABLE A12

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$ The above illustrates a principle of a codebook feedback technology in the LTE. During practical application, some detailed feedback methods may be involved.

First of all, a feedback granularity of the channel information is introduced as follows. In an LTE standard, a minimum feedback unit of the channel information is subband channel information. One subband may be composed of a plurality of Resource Blocks (RBs). Each of the RBs may consist of multiple Resource Elements (REs). The RE here is considered as a minimum unit for a time-frequency resource. A resource representation method of the LTE continues to be used in the LTE-A. Several subbands may be called as a multi-subband, and a great number of subbands may be called as a wideband.

A feedback content associated with the channel information in the LTE is introduced as follows. The types of Channel State Information (CSI) fed back may include: Channel Quality Indication (CQI) information, a Program Management Instruction (PMI) and a Rank Indicator (RI). Here, a most concerned CSI content may be the PMI information, but of course, the RI and the CQI also pertain to the content in the CSI feedback.

The CQI is an indicator for evaluating whether a downlink channel is good or bad. In a 36-213 protocol, the CQI is represented by an integer value within a range of 0-15. These integer values respectively represent different CQI levels, and different CQIs may correspond to their respective Modulation and Coding Schemes (MCS).

The RI is used for indicating the number of spatial independent channels and corresponds to ranks of a channel response matrix. Under open-loop spatial multiplexing and closed-loop spatial multiplexing modes, there is a need for a User Equipment (UE) to feed back the RI information. However, under other modes, the RI information may not need to be fed back. The ranks and the layers of the channel matrix are corresponding to each other.

Along with high-speed development of wireless communication technologies, wireless applications of users are increasingly rich, which leads to rapid growth of wireless data services. In future ten years, the data services may grow at 1.6-2 times of the rate each year and in turn brings an enormous challenge to a wireless access network. A multi-antenna technology is a key technology to cope with the explosive growth of the wireless data services. At present, the multi-antenna technology supported in a 4th Generation (4G) only supports a horizontal-dimension beamforming technology for eight ports at maximum and hence there is still a relatively large potential to greatly improve the system capacity.

With the development of the communication technology, a base station side may be provided with more antennas, thereby further improving the system capacity. While the antennas are increased and particularly a Three-Dimensional (3D) channel is established, it may be needed to redesign a downlink multi-antenna codebook. The design for the 8Tx described above complies with a Group of Blocks (GoB) model and may be viewed as follows.

$$W = W_1 \cdot W_2 \qquad (2)$$

Where $W_1$ is composed of four adjacent DFT vectors and is indicated by $i_1$. $W_2$ indicates a combination of sequence numbers of columns extracted from the $W_1$ and is indicated by $i_2$. Due to a $W_1$ form, the codebook for the 8Tx may be only suitable for the correlated channels. Once the $W_1$ for a long-cycle feedback is wrongly selected, within this cycle, no matter how the $W_2$ may be selected, a suitable codebook may not be found and therefore the performance of the whole cycle may be affected.

The above enhanced codebook for the 4Tx also employs the GoB model and is also represented by the model of the Formula (2). A difference between enhanced codebooks for the 4Tx and the 8Tx is that the $W_1$ of the enhanced codebook for the 4Tx consists of four orthogonal nonadjacent DFT vectors and is indicated by $i_1$. $W_2$ indicates a combination of sequence numbers of columns extracted from the $W_1$ and is indicated by $i_2$. The reasons for such design lie in that when the base station side adopts 4Tx dual-polarization configuration, the distance between the antennas may be very large and even up to four times of a wavelength. Under such a condition, the channel may be uncorrelated and therefore the designed code words are suitable for the uncorrelated channels. From a composition of the codebook for the 4Tx, it may be seen that when the $W_1$ for the long-cycle feedback is wrongly selected, the performance may not be seriously affected. However, after the $W_1$ for the long-cycle feedback may be selected, as the four DFT vectors in the $W_1$ are far apart, when the channel changes slowly, the same DFT vector combination may be selected by the $W_2$ all the time, such that the code word may not reflect the channel change.

SUMMARY

The following provides a summary to a subject matter described in detail in the exemplary embodiments of the present disclosure. The summary herein is not intended to limit the scope of protection of the claims.

The exemplary embodiments of the present disclosure provide a method and device for feeding back CSI in a multi-input multi-output system, which may solve the problem on how to implement the adaptability between a code word and a channel.

A method for feeding back CSI in a multi-input multi-output system may include the following acts.

A UE may feed back CSI including codebook index information to an eNodeB.

The codebook index information may include: a first type of codebook index set I and a second type of codebook index set J. A combination of the first type of index set I and the second type of index set J may be used for indicating a precoding matrix U. The precoding matrix U is an $N_t \times r$ matrix, where $N_t$ represents a total number of ports or a total number of antennas and r represents a number of transmission layers. The precoding matrix U may be composed of at least $Q \times r$ basic vectors having a dimension of $N_t/Q$, where $Q \geq 2$, $r \geq 1$, and Q and r are both positive integers. The basic vectors may be columns extracted from a matrix B composed of M columns of $N_t/Q$-dimensional vectors, where M may be a positive integer.

A union of the first type of index set I and the second type of index set J may include codebook indication information $i_1$, $i_2$ and $i_3$.

The codebook indication information $i_1$ may be used for representing selection information of K matrixes $W_{i_1,l}$ L $W_{i_1,k}$, where K may be a positive integer, each column of the K matrixes $W_{i_1,l}$ L $W_{i_1,k}$ may be extracted from column vectors included in the matrix B. The codebook indication information $i_3$ may be used for representing a matrix $W_{i_1,l}$ selected from the K matrixes. The codebook indication information $i_2$ may be used for representing information of one or more basic vectors extracted from the matrix $W_{i_1,l}$ and used to construct the precoding matrix U.

In an exemplary embodiment, the precoding matrix U may meet a model:

$$U = \begin{bmatrix} v_0 \\ \beta v_1 \end{bmatrix} \text{ or } U = \begin{bmatrix} v'_0 \\ \alpha v'_1 \\ \beta v'_2 \\ \alpha\beta v'_3 \end{bmatrix} \text{ or } U = \begin{bmatrix} v_0 & v_2 \\ \beta v_1 & -\beta v_3 \end{bmatrix} \text{ or }$$

-continued $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix}.$$

In the exemplary embodiment, vectors $v_0$, $v_1$, $v_2$, and $v_3$ may be vectors having a dimension of $N_t/2 \times 1$, vectors $v'_0$, $v'_1$, $v'_2$, $v'_3$, $v'_4$, $v'_5$, $v'_6$, and $v'_7$ may be vectors having a dimension of $N_t/4 \times 1$, $\alpha = e^{j\theta_1}$, and $\beta = e^{j\theta_2}$, where $0 \leq \theta_1 \leq 2\pi$, $0 \leq \theta_2 \leq 2\pi$.

In an exemplary embodiment, the first type of codebook index set I may at least include $i_1$ and $i_3$ information; and the second type of codebook index set J may at least include $i_2$ information.

Alternatively, the first type of codebook index set I may at least include $i_1$ and $i_2$ information; and the second type of codebook index set J may at least include $i_3$ information.

Alternatively, the first type of codebook index set I may at least include $i_1$ and $i_1$ information; and the second type of codebook index set J may at least include $i_2$ and $i_3$ information.

In an exemplary embodiment, the basic vectors composing the precoding matrix U may be divided into N1 groups; and the codebook indication information $i_3$ may include N1 pieces of sub-information $i_3(1)$ L $i_3(N1)$ $N1 \geq 2$ and may be a positive integer. In the exemplary embodiment, $i_3(x)$ may be used for representing information of a matrix $W_{i_1,l_x}$ selected for an xth group of vectors from the K matrixes $W_{i_1,l}$ L $W_{i_1,k}$ indicated by $i_1$, where $2 \leq x \leq N1$.

In an exemplary embodiment, the basic vectors composing the precoding matrix U may be divided into N2 groups; and the codebook indication information $i_2$ may include N2 pieces of sub-information $i_2(1)$ L $i_2(N2)$ $N2 \geq 2$. In the exemplary embodiment, $i_2(y)$ may be used for representing information of one or more basic vectors extracted from a matrix $W_{i_1,l_y}$ jointly indicated by $i_1$ and $i_3$ and used to construct the precoding matrix U, $2 \leq y \leq N2$.

In an exemplary embodiment, for the codebook model $$U = \begin{bmatrix} v'_0 \\ \alpha v'_1 \\ \beta v'_2 \\ \alpha\beta v'_3 \end{bmatrix} \text{ or } U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

at least one of the codebook indication information $i_1$, $i_2$ and $i_3$ may be further used to represent $\alpha$ information in the codebook model U.

In an exemplary embodiment, at least one of the codebook indication information $i_1$, $i_2$, and $i_3$ may be further used to represent $\beta$ information in the codebook model U.

In an exemplary embodiment, for the model $$U = \begin{bmatrix} v_0 & v_2 \\ \beta v_1 & -\beta v_3 \end{bmatrix},$$

the codebook indication information $i_3$ may include two pieces of sub-information $i_3(1)$ and $i_3(2)$.

In the exemplary embodiment, $i_3(1)$ may be used for representing information of a matrix $W_{i_1,i_3(1)}$ from which vectors $v_0$ and $v_2$ are extracted; and $i_3(2)$ may be used for representing information of a matrix $W_{i_1 i_3(2)}$ from which vectors $v_1$ and $v_2$ are extracted.

In the exemplary embodiment, alternatively, $i_3(1)$ may be used for representing information of a matrix $W_{i_1 i_3(1)}$ from which vectors $v_0$ and $v_1$ are extracted; and $i_3(2)$ may be used for representing information of a matrix $W_{i_1 i_3(2)}$ from which vectors $v_2$ and $v_3$ are extracted.

In an exemplary embodiment, for the model $$U = \begin{bmatrix} v'_0 \\ \alpha v'_1 \\ \beta v'_2 \\ \alpha\beta v'_3 \end{bmatrix},$$

the codebook indication information $i_3$ may include two pieces of sub-information $i_3(1)$ and $i_3(2)$.

In the exemplary embodiment, $i_3(1)$ may be used for representing information of a matrix $W_{i_1 i_3(1)}$ from which vectors $v'_0$ and $v'_1$ are extracted; and $i_3(2)$ may be used for representing information of a matrix $W_{i_1 i_3(2)}$ from which vectors $v'_2$ and $v'_3$ are extracted.

In the exemplary embodiment, alternatively, $i_3(1)$ may be used for representing information of a matrix $W_{i_1 i_3(1)}$ from which vectors $v'_0$ and $v'_2$ are extracted; and $i_3(2)$ may be used for representing information of a matrix $W_{i_1 i_3(2)}$ from which vectors $v'_1$ and $v'_3$ are extracted.

In an exemplary embodiment, for the model $$U = \begin{bmatrix} v'_0 \\ \alpha v'_1 \\ \beta v'_2 \\ \alpha\beta v'_3 \end{bmatrix},$$

the codebook indication information $i_2$ may include two pieces of sub-information $i_2(1)$ and $i_2(2)$.

In the exemplary embodiment, $i_2(1)$ may be used for representing information of a basic vector extracted from the matrix $W_{i_1 l}$ for vectors $v'_0$ and $v'_1$; and $i_2(2)$ may be used for representing information of a basic vector extracted from the matrix $W_{i_1 l}$ for vectors $v'_2$ and $v'_3$.

In the exemplary embodiment, alternatively, $i_2(1)$ may be used for representing information of a basic vector extracted from the matrix $W_{i_1 l}$ for vectors $v'_0$ and $v'_2$ and $i_2(2)$ may be used for representing information of a basic vector extracted from the matrix $W_{i_1 l'}$ for vectors $v'_1$ and $v'_3$.

In an exemplary embodiment, for the model $$U = \begin{bmatrix} v_0 & v_2 \\ \beta v_1 & -\beta v_3 \end{bmatrix},$$

the codebook indication information $i_2$ may include two pieces of sub-information $i_2(1)$ and $i_2(2)$.

In the exemplary embodiment, $i_2(1)$ may be used for representing information of a basic vector extracted from the matrix $W_{i_1 l}$ for vectors $v_0$ and $v_2$; and $i_2(2)$ may be used for representing information of a basic vector extracted from the matrix $W_{i_1 l}$ for vectors $v_1$ and $v_3$.

In the exemplary embodiment, alternatively, $i_2(1)$ may be used for representing information of a basic vector extracted from the matrix $W_{i_1 l}$ for vectors $v_0$ and $v_1$; and $i_2(2)$ may be used for representing information of a basic vector extracted from the matrix $W_{i_1 l'}$ for vectors $v_2$ and $v_3$.

In an exemplary embodiment, for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ may include four pieces of sub-information $i_2(1)$, $i_2(2)$, $i_2(3)$ and $i_2(4)$.

In the exemplary embodiment, $i_2(1)$ may be used for representing information of a basic vector extracted from the matrix $W_{i_1 l}$ for vectors $v'_0$ and $v'_4$; $i_2(2)$ may be used for representing information of a basic vector extracted from the matrix $W_{i_1 l'}$ for vectors $v'_1$ and $v'_5$; $i_2(3)$ may be used for representing information of a basic vector extracted from the matrix $W_{i_1 l''}$ for vectors $v'_2$ and $v'_6$; and $i_2(4)$ may be used for representing information of a basic vector extracted from the matrix $W_{i_1 l''}$ for vectors $v'_3$ and $v'_7$.

In an exemplary embodiment, for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ may include four pieces of sub-information $i_2(1)$, $i_2(2)$, $i_2(3)$ and $i_2(4)$.

In the exemplary embodiment, $i_2(1)$ may be used for representing information of a basic vector extracted from the matrix $W_{i_1 l}$ for vectors $v'_0$ and $v'_1$; $i_2(2)$ may be used for representing information of a basic vector extracted from the matrix $W_{i_1 l}$ for vectors $v'_2$ and $v'_3$; $i_2(3)$ may be used for representing information of a basic vector extracted from the matrix $W_{i_1 l''}$ for vectors $v'_4$ and $v'_5$; and $i_2(4)$ may be used for representing information of a basic vector extracted from the matrix $W_{i_1 l''}$ for vectors $v'_6$ and $v'_7$.

In the exemplary embodiment, alternatively, $i_2(1)$ may be used for representing information of a basic vector extracted from the matrix $W_{i_1 l}$ for vectors $v'_0$ and $v'_2$; $i_2(2)$ may be used for representing information of a basic vector extracted from the matrix for vectors $v'_1$ and $v'_3$; $i_2(3)$ may be used for representing information of a basic vector extracted from the matrix $W_{i_1 l''}$ for vectors $v'_4$ and $v'_6$; and $i_2(4)$ may be used for representing information of a basic vector extracted from the matrix $W_{i_1 l''}$ for vectors $v'_5$ and $v'_7$.

In an exemplary embodiment, $i_3(1)L\ i_3(N1)$ may have a linear relationship. When the CSI is reported, the UE may at least report one codebook indication information in $i_3(1)L\ i_3(N1)$.

In an exemplary embodiment, $i_2(1)L\ i_2(N2)$ may have a linear relationship. When the CSI is reported, the UE may at least report one codebook indication information in $i_2(1)L\ i_2(N2)$.

In an exemplary embodiment, $i_3(1)=i_3(2)$.

In an exemplary embodiment, $i_3(1)=i_3(2)$.

In an exemplary embodiment, $i_3(1)=i_3(2)=i_3(3)=i_3(4)$.

In an exemplary embodiment, $i_2(1)=i_2(2)$.

In an exemplary embodiment, $i_2(1)=i_2(2)$.

In an exemplary embodiment, $i_2(1)=i_2(2)=i_2(3)=i_2(4)$.

In an exemplary embodiment, the M columns of vectors composing the matrix B may be DFT vectors.

A method for feeding back CSI in a multi-input multi-output system may include the following acts.

A UE may feed back CSI including codebook index information to an eNodeB.

The codebook index information may include: a first type of codebook index set I and a second type of codebook index set J. A combination of the first type of index set I and the second type of index set J may be used for indicating a precoding matrix U. A union of the first type of index set I and the second type of index set J may include codebook indication information $i_1$, $i_2$ and $i_3$. The precoding matrix may meet a model: $U=W_1 \cdot W_2$, where U is an $N_t \times r$ matrix, $N_t$ represents a total number of ports or a total number of antennas and r represents a number of transmission layers.

The codebook indication information $i_1$ may be used for representing selection information of K matrixes $W_{i_1 l} L\ W_{i_1 k}$, where K may be a positive integer. The codebook indication information $i_3$ may be used for representing a matrix $W_{i_1 l}$ selected from the K matrixes. The codebook indication information $i_1$ and $i_3$ may jointly indicate $W_1$ information. The codebook indication information $i_2$ may be used for representing $W_2$ information. The codebook indication information $i_1$, $i_2$ and $i_3$ may jointly determine a precoding code word matrix U.

In an exemplary embodiment, the first type of codebook index set I may at least include $i_1$ and $i_3$ information; and the second type of codebook index set J may at least include $i_2$ information.

Alternatively, the first type of codebook index set I may at least include $i_1$ and $i_2$ information; and the second type of codebook index set J may at least include $i_3$ information.

Alternatively, the first type of codebook index set I may at least include $i_1$ information; and the second type of codebook index set J may at least include $i_2$ and $i_3$ information.

A device for feeding back CSI in a multi-input multi-output system may include: a first obtaining module and a first sending module.

The first obtaining module may be configured to obtain codebook index information.

The first sending module may be configured to feed back the CSI including the codebook index information to an eNodeB.

The codebook index information may include: a first type of codebook index set I and a second type of codebook index set J. A combination of the first type of index set I and the second type of index set J may be used for indicating a precoding matrix U. The precoding matrix U is an $N_t \times r$ matrix, where $N_t$ represents a total number of ports or a total number of antennas and r represents a number of transmission layers. The precoding matrix U may be composed of at least $Q \times r$ basic vectors having a dimension of $N_t/Q$, where $Q \geq 2$, $r \geq 1$, and Q and r are both positive integers. The basic vectors may be columns extracted from a matrix B composed of M columns of $N_t/Q$-dimensional vectors, where M may be a positive integer.

A union of the first type of index set I and the second type of index set J may include codebook indication information $i_1$, $i_2$ and $i_3$.

The codebook indication information $i_1$ may be used for representing selection information of K matrixes $W_{i_1 l} L\ W_{i_1 k}$, where K may be a positive integer, and each column of the K matrixes $W_{i_1 l} L\ W W_{i_1 k}$ may be extracted from column vectors included in the matrix B. The codebook indication information $i_3$ may be used for representing a matrix $W_{i_1 l}$ selected from the K matrixes. The codebook indication information $i_2$ may be used for representing information of one or more basic vectors extracted from the matrix $W_{i_1 l}$ and used to construct the precoding matrix U.

In an exemplary embodiment, the precoding matrix U may meet a model:

$$U = \begin{bmatrix} v_0 \\ \beta v_1 \end{bmatrix} \text{ or } U = \begin{bmatrix} v'_0 \\ \alpha v'_1 \\ \beta v'_2 \\ \alpha\beta v'_3 \end{bmatrix} \text{ or } U = \begin{bmatrix} v_0 & v_2 \\ \beta v_1 & -\beta v_3 \end{bmatrix} \text{ or}$$

$$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

In the exemplary embodiment, vectors $v_0$, $v_1$, $v_2$ and $v_3$ may be vectors having a dimension of $N_t/2 \times 1$, vectors $v'_0$, $v'_1$, $v'_2$, $v'_3$, $v'_4$, $v'_5$, $v'_6$ and $v'_7$ may be vectors having a dimension of $N_t/4 \times 1$, $\alpha = e^{j\theta_1}$, and $\beta = e^{j\theta_2}$, where $0 \leq \theta_1 \leq 2\pi$, $0 \leq \theta_2 \leq 2\pi$.

In an exemplary embodiment, the first type of codebook index set I may at least include $i_1$ and $i_3$ information; and the second type of codebook index set J may at least include $i_2$ information.

Alternatively, the first type of codebook index set I may at least include $i_1$ and $i_2$ information; and the second type of codebook index set J may at least include $i_3$ information.

Alternatively, the first type of codebook index set I may at least include $i_1$ information; and the second type of codebook index set J may at least include $i_2$ and $i_3$ information.

In an exemplary embodiment, the basic vectors composing the precoding matrix U may be divided into N1 groups; the codebook indication information $i_3$ may include N1 pieces of sub-information $i_3(1) L\ i_3(N1)$ $N1 \geq 2$ and may be a positive integer. In the exemplary embodiment, $i_3(x)$ may be used for representing information of a matrix $W_{i_1 l_x}$ selected for an Xth group of vectors from the K matrixes $W_{i_1 l} L\ W_{i_1 k}$ indicated by $i_1$, where $2 \leq x \leq N1$.

In an exemplary embodiment, the basic vectors composing the precoding matrix U may be divided into N2 groups; and the codebook indication information $i_2$ may include N2 pieces of sub-information $i_2(1) L\ i_2(N2)$ $N2 \geq 2$. In the exemplary embodiment, $i_2(y)$ may be used for representing information of one or more basic vectors extracted from a matrix $W_{i_1 l_y}$ jointly indicated by $i_1$ and $i_3$ and used to construct the precoding matrix U, $2 \leq y \leq N2$.

For the codebook model $$U = \begin{bmatrix} v'_0 \\ \alpha v'_1 \\ \beta v'_2 \\ \alpha\beta v'_3 \end{bmatrix} \text{ or } U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

at least one of the codebook indication information $i_1$, $i_2$ and $i_3$ may be further used to represent $\alpha$ information in the codebook model U.

In an exemplary embodiment, at least one of the codebook indication information $i_1$, $i_2$ and $i_3$ may be further used to represent $\beta$ information in the codebook model U.

In an exemplary embodiment, for the model $$U = \begin{bmatrix} v_0 & v_2 \\ \beta v_1 & -\beta v_3 \end{bmatrix},$$

the codebook indication information $i_3$ may include two pieces of sub-information $i_3(1)$ and $i_3(2)$.

In the exemplary embodiment, $i_3(1)$ may be used for representing information of a matrix $W_{i_1 i_3(1)}$ from which vectors $v_0$ and $v_2$ are extracted; and $i_3(2)$ may be used for representing information of a matrix $W_{i_1 i_3(2)}$ from which vectors $v_1$ and $v_3$ are extracted.

In the exemplary embodiment, alternatively, $i_3(1)$ may be used for representing information of a matrix $W_{i_1 i_3(1)}$ from which vectors $v_0$ and $v_1$ are extracted; and $i_3(2)$ may be used for representing information of a matrix $W_{i_1 i_3(2)}$ from which vectors $v_2$ and $v_3$ are extracted.

In an exemplary embodiment, for the model $$U = \begin{bmatrix} v'_0 \\ \alpha v'_1 \\ \beta v'_2 \\ \alpha \beta v'_3 \end{bmatrix},$$

the codebook indication information $i_3$ may include two pieces of sub-information $i_3(1)$ and $i_3(2)$.

In the exemplary embodiment, $i_3(1)$ may be used for representing information of a matrix $W_{i_1 i_3(1)}$ from which vectors $v'_0$ and $v'_1$ are extracted; and $i_3(2)$ may be used for representing information of a matrix $W_{i_1 i_3(2)}$ from which vectors $v'_2$ and $v'_3$ are extracted.

In the exemplary embodiment, alternatively, $i_3(1)$ may be used for representing information of a matrix $W_{i_1 i_3(1)}$ from which vectors $v'_0$ and $v'_2$ are extracted; and $i_3(2)$ may be used for representing information of a matrix $W_{i_1 i_3(2)}$ from which vectors $v'_1$ and $v'_3$ are extracted.

In an exemplary embodiment, for the model $$U = \begin{bmatrix} v'_0 & v'_4 \\ \alpha v'_1 & \alpha v'_5 \\ \beta v'_2 & -\beta v'_6 \\ \alpha \beta v'_3 & -\alpha \beta v'_7 \end{bmatrix},$$

the codebook indication information $i_3$ may include four pieces of sub-information $i_3(1)$, $i_3(2)$, $i_3(3)$ and $i_3(4)$. In the exemplary embodiment, $i_3(1)$ may be used for representing information of a matrix $W_{i_1 i_3(1)}$ from which vectors $v'_0$ and $v'_4$ are extracted; $i_3(2)$ may be used for representing information of a matrix $W_{i_1 i_3(2)}$ from which vectors $v'_1$ and $v'_5$ are extracted; $i_3(3)$ may be used for representing information of a matrix $W_{i_1 i_3(3)}$ from which vectors $v'_2$ and $v'_6$ are extracted; and $i_3(4)$ may be used for representing information of a matrix $W_{i_1 i_3(4)}$ from which vectors $v'_3$ and $v'_7$ are extracted.

In an exemplary embodiment, for the model $$U = \begin{bmatrix} v'_0 \\ \alpha v'_1 \\ \beta v'_2 \\ \alpha \beta v'_3 \end{bmatrix},$$

the codebook indication information $i_2$ may include two pieces of sub-information $i_2(1)$ and $i_2(2)$.

In the exemplary embodiment, $i_2(1)$ may be used for representing information of a basic vector extracted from the matrix $W_{i_1 l}$ for vectors $v'_0$ and $v'_1$; $i_2(2)$ may be used for representing information of a basic vector extracted from the matrix $W_{i_1 l}$ for vectors $v'_2$ and $v'_3$.

In the exemplary embodiment, alternatively, $i_2(1)$ may be used for representing information of a basic vector extracted from the matrix $W_{i_1 l}$ for vectors $v'_0$ and $v'_2$; and $i_2(2)$ may be used for representing information of a basic vector extracted from the matrix $W_{i_1 l}$ for vectors $v'_1$ and $v'_3$.

In an exemplary embodiment, for the model $$U = \begin{bmatrix} v_0 & v_2 \\ \beta v_1 & -\beta v_3 \end{bmatrix},$$

the codebook indication information $i_2$ may include two pieces of sub-information $i_2(1)$ and $i_2(2)$.

In the exemplary embodiment, $i_2(1)$ may be used for representing information of a basic vector extracted from the matrix $W_{i_1 l}$ for vectors $v_0$ and $v_2$; and $i_2(2)$ may be used for representing information of a basic vector extracted from the matrix $W_{i_1 l}$ for vectors $v_1$ and $v_3$.

In the exemplary embodiment, alternatively, $i_2(1)$ may be used for representing information of a basic vector extracted from the matrix $W_{i_1 l}$ for vectors $v_0$ and $v_1$; and $i_2(2)$ may be used for representing information of a basic vector extracted from the matrix $W_{i_1 l'}$ for vectors $v_2$ and $v_3$.

In an exemplary embodiment, for the model $$U = \begin{bmatrix} v'_0 & v'_4 \\ \alpha v'_1 & \alpha v'_5 \\ \beta v'_2 & -\beta v'_6 \\ \alpha \beta v'_3 & -\alpha \beta v'_7 \end{bmatrix},$$

the codebook indication information $i_2$ may include four pieces of sub-information $i_2(1)$, $i_2(2)$, $i_2(3)$ and $i_2(4)$.

In the exemplary embodiment, $i_2(1)$ may be used for representing information of a basic vector extracted from the matrix $W_{i_1 l}$ for vectors $v'_0$ and $v'_4$; $i_2(2)$ may be used for representing information of a basic vector extracted from the matrix $W_{i_1 l}$ for vectors $v'_1$ and $v'_5$; $i_2(3)$ may be used for representing information of a basic vector extracted from the matrix $W_{i_1 l''}$ for vectors $v'_2$ and $v'_6$; and $i_2(4)$ may be used for representing information of a basic vector extracted from the matrix $W_{i_1 l'''}$ for vectors $v'_3$ and $v'_7$.

In an exemplary embodiment, for the model $$U = \begin{bmatrix} v'_0 & v'_4 \\ \alpha v'_1 & \alpha v'_5 \\ \beta v'_2 & -\beta v'_6 \\ \alpha \beta v'_3 & -\alpha \beta v'_7 \end{bmatrix},$$

the codebook indication information $i_2$ may include four pieces of sub-information $i_2(1)$, $i_2(2)$, $i_2(3)$ and $i_2(4)$.

In the exemplary embodiment, $i_2(1)$ may be used for representing information of a basic vector extracted from the matrix $W_{i_1l}$ for vectors $v'_0$ and $v'_1$; $i_2(2)$ may be used for representing information of a basic vector extracted from the matrix $W_{i_1l}$ for vectors $v'_2$ and $v'_3$; $i_2(3)$ may be used for representing information of a basic vector extracted from the matrix $W_{i_1l''}$ for vectors $v'_4$ and $v'_5$; and $i_2(4)$ may be used for representing information of a basic vector extracted from the matrix $W_{i_1l'''}$ for vectors $v'_6$ and $v'_7$.

In the exemplary embodiment, alternatively, $i_2(1)$ may be used for representing information of a basic vector extracted from the matrix $W_{i_1l}$ for vectors $v'_0$ and $v'_2$; $i_2(2)$ may be used for representing information of a basic vector extracted from the matrix $W_{i_1l'}$ for vectors $v'_1$ and $v'_3$; $i_2(3)$ may be used for representing information of a basic vector extracted from the matrix $W_{i_1l''}$ for vectors $v'_4$ and $v'_6$; and $i_2(4)$ may be used for representing information of a basic vector extracted from the matrix $W_{i_1l''}$ for vectors $v'_5$ and $v'_7$.

In an exemplary embodiment, $i_3(1)L$ $i_3(N1)$ may have a linear relationship. When the CSI is reported, the UE may at least report one codebook indication information in $i_3(1)L$ $i_3(N1)$.

In an exemplary embodiment, $i_2(1)L$ $i_2(N2)$ may have a linear relationship. When the CSI is reported, the UE may at least report one codebook indication information in $i_2(1)L$ $i_2(N2)$.

In an exemplary embodiment, $i_3(1)=i_3(2)$.

In an exemplary embodiment, $i_3(1)=i_3(2)$.

In an exemplary embodiment, $i_2(1)=i_3(2)=i_3(3)=i_3(4)$.

In an exemplary embodiment, $i_2(1)=i_2(2)$.

In an exemplary embodiment, $i_2(1)=i_2(2)$.

In an exemplary embodiment, $i_2(1)=i_2(2)=i_2(3)=i_2(4)$.

In an exemplary embodiment, the M columns of vectors composing the matrix B may be DFT vectors.

A device for feeding back CSI in a multi-input multi-output system may include: a second obtaining module and a second sending module.

The second obtaining module may be configured to obtain codebook index information.

The second sending module may be configured to feed back the CSI including the codebook index information to an eNodeB.

The codebook index information may include: a first type of codebook index set I and a second type of codebook index set J. A combination of the first type of index set I and the second type of index set J may be used for indicating a precoding matrix U a union of the first type of index set I and the second type of index set J may include codebook indication information $i_1$, $i_2$ and $i_3$. The precoding matrix may meet a model: $U=W_1 \cdot W_2$, where U is an $N_t \times r$ matrix, $N_t$ represents a total number of ports or a total number of antennas and r represents a number of transmission layers.

The codebook indication information $i_1$ may be used for representing selection information of K matrixes $W_{i_1l}$ L $W_{i_jk}$, where K may be a positive integer; $i_3$ may be used for representing a matrix $W_{i_1l}$ selected from the K matrixes; $i_1$ and $i_3$ may jointly indicate $W_1$ information; $i_2$ may be used for representing $W_2$ information; the $i_1$, $i_2$ and $i_3$ may jointly determine a precoding code word matrix U.

In an exemplary embodiment, the first type of codebook index set I may at least include $i_1$ and $i_3$ information; the second type of codebook index set J may at least include $i_2$ information.

Alternatively, the first type of codebook index set I may at least include $i_1$ and $i_2$ information; the second type of codebook index set J may at least include $i_3$ information.

Alternatively, the first type of codebook index set I may at least include $i_1$ information; the second type of codebook index set J may at least include $i_2$ and $i_3$ information.

A computer readable storage medium is also provided. The computer readable storage medium may store a computer executable instruction, and the computer executable instruction may be used to implement any one of the methods.

According to some embodiments of the present disclosure, the code word may be not only suitable for the correlated channels, but also suitable for the uncorrelated channels. It may be ensured that the code word may achieve a relatively good performance when the $W_1$ is wrongly selected. Furthermore, when the channel changes slowly in a cycle, the code word may still be changed; and thus, the good adaptability may be achieved.

After reading and understanding the accompanying drawings and the detailed description, other aspects of the present disclosure may be clearly understood.

DETAILED DESCRIPTION OF THE EMBODIMENTS

Figure 1:
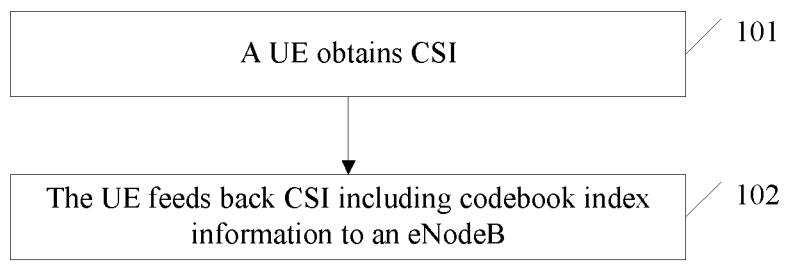
FIG. 1 is a flowchart of a method for feeding back CSI in a multi-input multi-output system according to an embodiment of the present disclosure.

The present disclosure is described below with reference to the drawings and embodiments in detail. It should be noted that the embodiments of the present application and the characteristics of the embodiments may be combined with each other if there is no conflict. FIG. 1 is a flowchart of a method for feeding back CSI in a multi-input multi-output system according to an embodiment of the present disclosure. As shown in FIG. 1, the method may include the following acts.

At act 101, a UE may obtain CSI.

At act 102, the UE may feed back CSI including codebook index information to an eNodeB.

The codebook index information provided by the embodiments of the present disclosure will be described below.

First Embodiment

The eNB is provided with eight antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook of 8Tx is $U_8=W_1 \cdot W_2$.

Where:

$$W_{1,n} = \begin{bmatrix} X_n & 0 \\ 0 & X_n \end{bmatrix}$$

where n=0, 1, . . . , 15

$$X_n = \begin{bmatrix} 1 & 1 & 1 & 1 \\ q_1^n & q_1^{n+8} & q_1^{n+16} & q_1^{n+24} \\ q_1^{2n} & q_1^{2n+16} & q_1^{2n} & q_1^{2n+16} \\ q_1^{3n} & q_1^{3n+24} & q_1^{3n+16} & q_1^{3n+8} \end{bmatrix}$$

where $q_1 = e^{j2\pi/32}$

For rank 1, $$W_{2,n} \in \left\{ \frac{1}{2\sqrt{2}} \begin{bmatrix} Y \\ \alpha(i)Y \end{bmatrix}, \frac{1}{2\sqrt{2}} \begin{bmatrix} Y \\ j\alpha(i)Y \end{bmatrix}, \frac{1}{2\sqrt{2}} \begin{bmatrix} Y \\ -\alpha(i)Y \end{bmatrix}, \frac{1}{2\sqrt{2}} \begin{bmatrix} Y \\ -j\alpha(i)Y \end{bmatrix} \right\}$$

Where: $Y \in \{e_1, e_2, e_3, e_4\}$ and $\alpha(i) = q_1^{2(i-1)}$; $W_2$ code words are sequenced in a manner the same as enhanced codebooks of 4Tx in 36.213.

For rank 2, $$W_{2,n} \in \left\{ \frac{1}{4} \begin{bmatrix} Y_1 & Y_2 \\ Y_1 & -Y_2 \end{bmatrix}, \frac{1}{4} \begin{bmatrix} Y_1 & Y_2 \\ jY_1 & -jY_2 \end{bmatrix} \right\}$$

Where: $(Y_1, Y_2) = (e_i, e_k) \in \{(e_1, e_1), (e_2, e_2), (e_3, e_3), (e_4, e_4), (e_1, e_2), (e_2, e_3), (e_1, e_4), (e_2, e_4)\}$ In an exemplary embodiment, for the rank 2, the $W_2$ code words are sequenced as a Table B1-1 below.

The codebook indication information may include three parts, namely $i_1$, $i_2$ and $i_3$, where $i_1$ indication information is shown in a Table B1-2.

TABLE B1-2

| $i_1$ Index | Including $W_{1,n}$ relationship $i_3$ Index | | | |
|---|---|---|---|---|
| | 0 | 1 | 2 | 3 |
| 0 | $W_{1,0}$ | $W_{1,1}$ | $W_{1,2}$ | $W_{1,3}$ |
| 1 | $W_{1,4}$ | $W_{1,5}$ | $W_{1,6}$ | $W_{1,7}$ |
| 2 | $W_{1,8}$ | $W_{1,9}$ | $W_{1,10}$ | $W_{1,11}$ |
| 3 | $W_{1,12}$ | $W_{1,13}$ | $W_{1,14}$ | $W_{1,15}$ |

The UE may select a value of $i_1$ to be $i_1=0$ according to a channel measurement information result. Then, an act is carried out to select $i_3$, the UE may select $i_3=0$ according to the channel measurement result. In combination with the results of $i_1$ and $i_3$, the selected $W_1$ may be finally determined and then $i_2$ may be selected.

It is assumed that the code word selected by the UE is a code cord under rank 1 and $i_2=1$ is selected, the code word selected by the UE is

TABLE B1-1

| $W_2$ Index | 0 | 1 | 2 | 4 |
|---|---|---|---|---|
| Code word structure $(Y_1, Y_2)$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ |
| | $(e_1, e_1)$ | $(e_1, e_1)$ | $(e_2, e_2)$ | $(e_2, e_2)$ |
| $W_2$ Index | 5 | 6 | 7 | 8 |
| Code word structure $(Y_1, Y_2)$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ |
| | $(e_3, e_3)$ | $(e_3, e_3)$ | $(e_4, e_4)$ | $(e_4, e_4)$ |
| $W_2$ Index | 9 | 10 | 11 | 12 |
| Code word structure $(Y_1, Y_2)$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ |
| | $(e_1, e_2)$ | $(e_1, e_2)$ | $(e_2, e_3)$ | $(e_2, e_3)$ |
| $W_2$ Index | 13 | 14 | 15 | 16 |
| Code word structure $(Y_1, Y_2)$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ | $\frac{1}{4}\begin{bmatrix} Y_1 & Y_2 \\ Y_1 & -Y_2 \end{bmatrix}$ | $\frac{1}{4}\begin{bmatrix} Y_1 & Y_2 \\ jY_1 & -jY_2 \end{bmatrix}$ |
| | $(e_1, e_4)$ | $(e_1, e_4)$ | $(e_2, e_4)$ | $(e_2, e_4)$ |

$$\frac{1}{2\sqrt{2}} \begin{bmatrix} 1 \\ j \\ -1 \\ -j \\ e^{j\frac{\pi}{16}} \\ j \cdot e^{j\frac{\pi}{16}} \\ -e^{j\frac{\pi}{16}} \\ -j \cdot e^{j\frac{\pi}{16}} \end{bmatrix}.$$

The UE may report RI=1 and report the PMI information I, J of the selected code word. Herein, I is reported as $i_3=0$ and J is reported as $i_3=0$ and $i_2=1$.

Alternatively, the UE may report the PMI information I, J of the selected code word. Herein, I is reported as $i_3=0$ and $i_3=0$ and J is reported as $i_2=1$.

Alternatively, the UE may report the PMI information I, J of the selected code word. Herein, I is reported as $i_3=0$ and $i_2=1$ and J is reported as $i_3=0$.

It is assumed that the code word selected by the UE is a code cord under rank 2 and $i_2=0$ is selected, the code word selected by the UE is $$\frac{1}{4} \begin{bmatrix} 1 & 1 \\ 1 & 1 \\ 1 & 1 \\ 1 & 1 \\ 1 & -1 \\ 1 & -1 \\ 1 & -1 \\ 1 & -1 \end{bmatrix}.$$

At this moment, the UE may report RI=2 and report the PMI information I, J of the selected code word. Herein, reported information of I may include $i_3=0$, and reported information of J may include $i_3=0$ and $i_2=0$.

Alternatively, the UE may report the PMI information I, J of the selected code word. Herein, reported information of I may include $i_3=0$ and $i_3=0$, and reported information of J may include $i_2=0$.

Alternatively, the UE may report the PMI information I, J of the selected code word. Herein, reported information of I may include $i_1=0$ and $i_2=0$, and reported information of J may include $i_3=0$.

Second Embodiment

The eNB is provided with eight antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook of 8Tx is $U_8 = W_1 \cdot W_2$.
Where:

$$W_{1,n} = \begin{bmatrix} X_n & 0 \\ 0 & X_n \end{bmatrix}$$

where n=0, 1, ..., 15

$$X_n = \begin{bmatrix} 1 & 1 & 1 & 1 \\ q_1^n & q_1^{n+8} & q_1^{n+16} & q_1^{n+24} \\ q_1^{2n} & q_1^{2n+16} & q_1^{2n} & q_1^{2n+16} \\ q_1^{3n} & q_1^{3n+24} & q_1^{3n+16} & q_1^{3n+8} \end{bmatrix}$$

where $q_1 = e^{j2\pi/32}$

For rank 1, $$W_{2,n} \in \left\{ \frac{1}{2\sqrt{2}} \begin{bmatrix} Y \\ \alpha(i)Y \end{bmatrix}, \frac{1}{2\sqrt{2}} \begin{bmatrix} Y \\ j\alpha(i)Y \end{bmatrix}, \frac{1}{2\sqrt{2}} \begin{bmatrix} Y \\ -\alpha(i)Y \end{bmatrix}, \frac{1}{2\sqrt{2}} \begin{bmatrix} Y \\ -j\alpha(i)Y \end{bmatrix} \right\}$$

Where: $Y \in \{e_1, e_2, e_3, e_4\}$ and $\alpha(i) = q_1^{2(i-1)}$;

For rank 2, $$W_{2,n} \in \left\{ \frac{1}{4} \begin{bmatrix} Y_1 & Y_2 \\ Y_1 & -Y_2 \end{bmatrix}, \frac{1}{4} \begin{bmatrix} Y_1 & Y_2 \\ jY_1 & -jY_2 \end{bmatrix} \right\}$$

Where: $(Y_1, Y_2) = (e_i, e_k) \in \{(e_1, e_1), (e_2, e_2), (e_3, e_3), (e_4, e_4), (e_1, e_2), (e_2, e_3), (e_1, e_4), (e_2, e_4)\}$ The codebook sequencing index method is as shown in the first embodiment.

The codebook indication information may include three parts, namely, $i_1$, $i_2$ and $i_3$, where $i_1$ indication information is shown in a Table B2-1.

TABLE B2-1

| $i_1$ Index | Including $W_{1,n}$ relationship $i_3$ Index | | | |
| --- | --- | --- | --- | --- |
| | 0 | 1 | 2 | 3 |
| 0 | $W_{1,0}$ | $W_{1,1}$ | $W_{1,2}$ | $W_{1,3}$ |
| 1 | $W_{1,2}$ | $W_{1,3}$ | $W_{1,4}$ | $W_{1,5}$ |
| 2 | $W_{1,4}$ | $W_{1,5}$ | $W_{1,6}$ | $W_{1,7}$ |
| 3 | $W_{1,6}$ | $W_{1,7}$ | $W_{1,8}$ | $W_{1,9}$ |
| 4 | $W_{1,8}$ | $W_{1,9}$ | $W_{1,10}$ | $W_{1,11}$ |
| 5 | $W_{1,10}$ | $W_{1,11}$ | $W_{1,12}$ | $W_{1,13}$ |
| 6 | $W_{1,12}$ | $W_{1,13}$ | $W_{1,14}$ | $W_{1,15}$ |
| 7 | $W_{1,14}$ | $W_{1,15}$ | $W_{1,0}$ | $W_{1,1}$ |

The UE may select a value of $i_1$ to be $i_1=7$ according to a channel measurement information result. Then, an act is carried out to select $i_3$, for example, the UE may select $i_3=2$ according to the channel measurement result. In combination with the results of $i_1$ and $i_3$, the selected $W_1$ may be finally determined and then $i_2$ may be selected.

It is assumed that the code word selected by the UE is a code cord under rank 1 and $i_2=1$ is selected, the code word selected by the UE is $$\frac{1}{2\sqrt{2}}\begin{bmatrix} 1 \\ j \\ -1 \\ -j \\ e^{j\frac{\pi}{16}} \\ j \cdot e^{j\frac{\pi}{16}} \\ -e^{j\frac{\pi}{16}} \\ -j \cdot e^{j\frac{\pi}{16}} \end{bmatrix}.$$

The UE may report RI=1 and report the PMI information I, J of the selected code word. Herein, I is reported as $i_1=7$ and J is reported as $i_3=2$ and $i_2=1$.

It is assumed that the code word selected by the UE is a code cord under rank 2 and $i_2=0$ is selected, the code word selected by the UE is $$\frac{1}{4}\begin{bmatrix} 1 & 1 \\ 1 & 1 \\ 1 & 1 \\ 1 & 1 \\ 1 & -1 \\ 1 & -1 \\ 1 & -1 \\ 1 & -1 \end{bmatrix}.$$

At this moment, the UE may report RI=2 and report the PMI information I, J of the selected code word. Herein, reported information of I may include $i_1=7$, and reported information of J may include $i_3=2$ and $i_2=0$.

Third Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 1/2 is as follows.

$$U_1 = \begin{bmatrix} v_0 \\ \beta v_1 \end{bmatrix}$$

$$U_2 = \begin{bmatrix} v_0 & v_2 \\ \beta v_1 & -\beta v_3 \end{bmatrix}$$

In the code word, the $v_0$, $v_1$, $v_2$ and $v_3$ are all DFT vectors and are column vectors extracted from a matrix B, where the matrix B is defined as follows.

$$B = [b_0 \ b_1 \ L \ b_{31}], [B]_{1+m,1+n} = e^{j\frac{2\pi mn}{32}},$$

$$m = 0, 1, L, 7, n = 0, 1, L, 31$$

$X^{(p)} \in$ $\{[b_{2k \bmod 32} \ b_{(2k+1) \bmod 32} \ b_{(2k+2) \bmod 32} \ b_{(2k+3) \bmod 32}] : p = 0, 1, L, 15\}$ The corresponding relationship between $i_1$ and $X^{(p)}$ is as shown in a Table B3-1.

TABLE B3-1

Table 3-1

| | Including $X^{(p)}$ relationship $i_3$ Index | | | |
|---|---|---|---|---|
| $i_1$ Index | 0 | 1 | 2 | 3 |
| 0 | $X^{(0)}$ | $X^{(4)}$ | $X^{(8)}$ | $X^{(12)}$ |
| 1 | $X^{(1)}$ | $X^{(5)}$ | $X^{(9)}$ | $X^{(13)}$ |
| 2 | $X^{(2)}$ | $X^{(6)}$ | $X^{(10)}$ | $X^{(14)}$ |
| 3 | $X^{(3)}$ | $X^{(7)}$ | $X^{(11)}$ | $X^{(15)}$ |

The $i_3$ is used to determine, together with the $i_1$, a DFT vector range $X^{(p)}$ for vector selection. The $i_2$ may be used for indicating information of the column vectors extracted from the $X^{(p)}$.

For the rank 1:

$$C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}, Y \in \{\tilde{e}_1, \tilde{e}_2, \tilde{e}_3, \tilde{e}_4\}$$

For the rank 2:

$$C_2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

$Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

It is assumed that the code word selected by the UE is a code cord under rank 2, the UE may select a value of $i_1$ to be $i_1=1$ according to a channel measurement information result. Then $i_3=2$ may be selected. The selected $X^{(p_1)}$ and $X^{(p_2)}$ are finally determined by the UE according to the results of $i_1$ and $i_3$, and thereafter, $i_2=0$ may be selected.

At this moment, the UE may report RI=2 and report the PMI information I, J of the selected code word. Herein, reported information of I may include $i_1=1$, and reported information of J may include $i_3=2$ and $i_2=0$.

Alternatively, the UE may report the PMI information I, J of the selected code word. Herein, reported information of I may include $i_1=1$ and $i_3=2$, and reported information of J may include $i_2=0$.

Alternatively, the UE may report the PMI information I, J of the selected code word. Herein, reported information of I may include $i_1=1$ and $i_2=0$, and reported information of J may include $i_3=2$.

Fourth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 1/2 is as follows.

$$U_1 = \begin{bmatrix} v_0 \\ \beta v_1 \end{bmatrix}$$

$$U_2 = \begin{bmatrix} v_0 & v_2 \\ \beta v_1 & -\beta v_3 \end{bmatrix}$$

A certain adjustment is made for the above Formula, and the common factors are extracted out to obtain:

$$U'_1 = \frac{1}{4}\begin{bmatrix} v'_0 \\ \beta v'_1 \end{bmatrix}$$

$$U'_2 = \frac{1}{4\sqrt{2}}\begin{bmatrix} v'_0 & v'_2 \\ \beta v'_1 & -\beta v'_3 \end{bmatrix}$$

In the code word, $v'_0$, $v'_1$, $v'_2$ and $v'_3$ are all DFT vectors and are column vectors extracted from a matrix B, where the matrix B is defined as follows.

$$B = [b_0 \ b_1 \ L \ b_{31}], [B]_{1+m,1+n} = e^{j\frac{2\pi mn}{32}},$$
$$m = 0, 1, L, 7, n = 0, 1, L, 31$$

$$X^{(p)} \in$$
$$\{[b_{2k \bmod 32} \ b_{(2k+1) \bmod 32} \ b_{(2k+2) \bmod 32} \ b_{(2k+3) \bmod 32}]: p = 0, 1, L, 15\}$$

The $i_1$ may be used for indicating information about a range to extract the DFT vectors in $v'_0$, $v'_1$, $v'_2$ and $v'_3$. The corresponding relationship between $i_1$ and $X^{(p)}$ is as shown in a Table B4-1.

TABLE B4-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(4)}$ | $X^{(8)}$ | $X^{(12)}$ |
| 1 | $X^{(1)}$ | $X^{(5)}$ | $X^{(9)}$ | $X^{(13)}$ |
| 2 | $X^{(2)}$ | $X^{(6)}$ | $X^{(10)}$ | $X^{(14)}$ |
| 3 | $X^{(3)}$ | $X^{(7)}$ | $X^{(11)}$ | $X^{(15)}$ |

The $i_3$ is used to determine, together with the $i_1$, a DFT vector matrix $X^{(p)}$ for vector selection and may include two parts, namely $i_3(1)$ and $i_3(2)$. The $i_2$ may be used for indicating information of the column vectors extracted from the $X^{(p)}$ and may include phase $\beta$ information.

For the code word under rank 1, $i_3(1)$ is used to represent a DFT vector selection matrix $X^{Pi_3(1)}$ of the vector $v'_0$ based on $i_1$; and $i_3(2)$ is used to represent a DFT vector selection matrix $X^{Pi_3(2)}$ of the vector $v'_1$ based on $i_1$.

For the code word under rank 2, $i_3(1)$ is used to represent a DFT vector selection matrix $X^{Pi_3(1)}$ of the vectors $v'_0$ and $v'_1$ based on $i_1$; and $i_3(2)$ is used to represent a DFT vector selection matrix $X^{Pi_3(2)}$ of the vectors $v'_2$ and $v'_3$ based on $i_1$.

For the rank 1:

$$C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}, Y \in \{\tilde{e}_1, \tilde{e}_2, \tilde{e}_3, \tilde{e}_4\}$$

For the rank 2:

$$C_2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

It is assumed that the code word selected by the UE is a code cord under rank 2, and the UE may select a value of $i_1$ to be $i_1=1$ according to a channel measurement information result. Then, an act is carried out to select $i_3$ and respectively select values of the $i_3(1)$ and $i_3(2)$, the UE may select $i_3(1)=1$ and $i_3(2)=2$ according to the channel measurement result. The $X^{(p1)}$ and $X^{(p2)}$ are finally determined according to the results of $i_1$ and $i_3$. And $i_2=0$ may be selected.

At this moment, the UE may report RI=2 and report the PMI information I, J of the selected code word. Herein, reported information of I may include $i_1=1$, and reported information of J may include $i_3(1)=1$, $i_3(2)=2$ and $i_2=0$.

Alternatively, the UE may report the PMI information I, J of the selected code word. Herein, reported information of I may include $i_1=1$, $i_3(1)=1$ and $i_3(2)=2$, and reported information of J may include $i_2=0$.

Fifth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under ranks 1-2 is as follows.

$$U_1 = \begin{bmatrix} v_0 \\ \beta v_1 \end{bmatrix} \ U_2 = \begin{bmatrix} v_0 & v_2 \\ \beta v_1 & -\beta v_3 \end{bmatrix}$$

A certain adjustment is made for the above Formula, and the common factors are extracted out to obtain:

$$U'_1 = \frac{1}{4}\begin{bmatrix} v'_0 \\ \beta v'_1 \end{bmatrix} \ U'_2 = \frac{1}{4\sqrt{2}}\begin{bmatrix} v'_0 & v'_2 \\ \beta v'_1 & -\beta v'_3 \end{bmatrix}$$

In the code word, $v'_0$, $v'_1$, $v'_2$ and $v'_3$ are all DFT vectors and are column vectors extracted from a matrix B, where the matrix B is defined as follows.

$$B = [b_0 \ b_1 \ L \ b_{31}], [B]_{1+m,1+n} = e^{j\frac{2\pi mn}{32}}, m = 0, 1, L, 7, n = 0, 1, L, 31$$

$$X^{(p)} \in \{[b_{2k \bmod 32} \ b_{(2k+1) \bmod 32} \ b_{(2k+2) \bmod 32} \ b_{(2k+3) \bmod 32}]: p = 0, 1, L, 15\}$$

The $i_1$ may be used for indicating information about a range to extract the DFT vectors in $v'_0$, $v'_1$, $v'_2$ and $v'_3$. The corresponding relationship between $i_1$ and $X^{(p)}$ is as shown in a Table B5-1.

TABLE B5-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(4)}$ | $X^{(8)}$ | $X^{(12)}$ |
| 1 | $X^{(1)}$ | $X^{(5)}$ | $X^{(9)}$ | $X^{(13)}$ |
| 2 | $X^{(2)}$ | $X^{(6)}$ | $X^{(10)}$ | $X^{(14)}$ |
| 3 | $X^{(3)}$ | $X^{(7)}$ | $X^{(11)}$ | $X^{(15)}$ |

The $i_3$ is used to determine, together with the $i_1$, a DFT vector range for vector selection and may include two parts, namely $i_3(1)$ and $i_3(2)$.

For the code word under rank 1, $i_3(1)$ is used to represent a DFT vector selection matrix $X^{Pi_3(1)}$ of the vector $v'_0$ based on $i_1$; and $i_3(2)$ is used to represent a DFT vector selection matrix $X^{Pi_3(2)}$ of the vector $v'_1$ based on $i_1$.

For the code word under rank 2, $i_3(1)$ is used to represent a DFT vector selection matrix $X^{Pi_3(1)}$ of the vectors $v'_0$ and $v'_1$ based on $i_1$; and $i_3(2)$ is used to represent a DFT vector selection matrix $X^{Pi_3(2)}$ of the vectors $v'_2$ and $v'_3$ based on $i_1$.

The $i_2$ may be used for indicating information of the column vectors extracted from the $X^{(p)}$ and may include phase $\beta$ information. The $i_2$ may include two parts. $i_2(1)$ is used to represent a column vector extracted based on $i_1$ and $i_3(1)$ selection matrix $X^{Pi_3(1)}$; and $i_2(2)$ is used to represent a column vector extracted based on $i_1$ and $i_3(1)$ selection matrix $X^{Pi_3(2)}$.

For the rank 1, the corresponding relationship among $i_2(1)$, $i_2(2)$ and $\beta$ is as shown in a Table B5-2.

TABLE B5-2

| Index | 0 | 1 | 2 | 3 |
|---|---|---|---|---|
| $i_2(1)$ | $\tilde{e}_\varphi$ | $\tilde{e}_\varphi$ | $\tilde{e}_\varphi$ | $\tilde{e}_\varphi$ |
| $i_2(2)$ | $\tilde{e}_\varphi$ | $\tilde{e}_\varphi$ | $\tilde{e}_\varphi$ | $\tilde{e}_\varphi$ |
| $\beta$ | 1 | j | −1 | −j |

For the rank 2:

$$C_{i_2(1)} = \left\{ \begin{bmatrix} Y_1 \\ Y'_1 \end{bmatrix} \begin{bmatrix} Y_1 \\ jY'_1 \end{bmatrix} \right\} \quad C_{i_2(2)} = \left\{ \begin{bmatrix} Y_2 \\ -Y'_2 \end{bmatrix} \begin{bmatrix} Y_2 \\ -jY'_2 \end{bmatrix} \right\}$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

It is assumed that the code word selected by the UE is a code cord under rank 2, and the UE may select a value of $i_1$ to be $i_1=1$ according to a channel measurement information result. Then, an act is carried out to select $i_3$ and respectively select values of the $i_3(1)$ and $i_3(2)$, the UE may select $i_3(1)=1$ and $i_3(2)=2$ according to the channel measurement result. The selected $X^{(p_1)}$ and $X^{(p_2)}$ are finally determined according to the results of $i_1$ and $i_3$. Thereafter, $i_2$ may be selected and $i_2(1)=1$ and $i_2(2)=3$ are selected.

At this moment, the UE may report RI=2 and report the PMI information I, J of the selected code word. Herein, reported information of I may include $i_1=1$, and reported information of J may include $i_3(1)=1$, $i_3(2)=2$, $i_2(1)=1$ and $i_2(2)=3$.

Alternatively, the UE may report the PMI information I, J of the selected code word. Herein, reported information of I may include $i_1=1$, $i_3(1)=1$ and $i_3(2)=2$, and reported information of J may include $i_2(1)=1$ and $i_2(2)=3$.

Sixth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under ranks 1-2 is as follows.

$$U_1 = \begin{bmatrix} v_0 \\ \beta v_1 \end{bmatrix} \quad U_2 = \begin{bmatrix} v_0 & v_2 \\ \beta v_1 & -\beta v_3 \end{bmatrix}$$

A certain adjustment is made for the above Formula, and the common factors are extracted out to obtain:

$$U'_1 = \frac{1}{4}\begin{bmatrix} v'_0 \\ \beta v'_1 \end{bmatrix} \quad U'_2 = \frac{1}{4\sqrt{2}}\begin{bmatrix} v'_0 & v'_2 \\ \beta v'_1 & -\beta v'_3 \end{bmatrix}$$

In the code word, $v'_0$, $v'_1$, $v'_2$ and $v'_3$ are all DFT vectors and are column vectors extracted from a matrix B, where the matrix B is defined as follows.

$$B = [b_0 \ b_1 \ L \ b_{31}], [B]_{1+m,1+n} = e^{j\frac{2\pi mn}{32}}, m = 0, 1, L, 7, n = 0, 1, L, 31$$

$$X^{(p)} \in \{[b_{k \bmod 32} \ b_{(k+8) \bmod 32} \ b_{(k+16) \bmod 32} \ b_{(k+24) \bmod 32}]: p = 0, 1, L, 15\}$$

The $i_1$ may be used for indicating information about a range to extract the DFT vectors in $v'_0$, $v'_1$, $v'_2$ and $v'_3$. The corresponding relationship between $i_1$ and $X^{(p)}$ is as shown in a Table B6-1.

TABLE B6-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(1)}$ | $X^{(2)}$ | $X^{(3)}$ |
| 1 | $X^{(4)}$ | $X^{(5)}$ | $X^{(6)}$ | $X^{(7)}$ |
| 2 | $X^{(8)}$ | $X^{(9)}$ | $X^{(10)}$ | $X^{(11)}$ |
| 3 | $X^{(12)}$ | $X^{(13)}$ | $X^{(14)}$ | $X^{(15)}$ |

The $i_3$ is used to determine, together with the $i_1$, a DFT vector range for vector selection and may include two parts, namely $i_3(1)$ and $i_3(2)$. The $i_2$ may be used for indicating information of the column vectors extracted from the $X^{(p)}$ and may include phase $\beta$ information.

For the code word under rank 1, $i_3(1)$ is used to represent a DFT vector selection matrix $X^{(Pi_3(1))}$ of the vector $v'_0$ based on $i_1$; and $i_3(2)$ is used to represent a DFT vector selection matrix $X^{Pi_3(2)}$ of the vector $v'_1$ based on $i_1$.

For the code word under rank 2, $i_3(1)$ is used to represent a DFT vector selection matrix $X^{Pi3(1)}$ of the vectors $v'_0$ and $v'_2$ based on $i_1$; and $i_3(2)$ is used to represent a DFT vector selection matrix $X^{Pi3(2)}$ of the vectors $v'_1$ and $v'_3$ based on $i_1$.

The $i_2$ is represented as follows.
For the rank 1:

$$C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}, Y \in \{e_1^{\%}, e_2^{\%}, e_3^{\%}, e_4^{\%}\}$$

For the rank 2:

$$C_2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

It is assumed that the code word selected by the UE is a code cord under rank 2, the UE may select a value of $i_1$ to be $i_1=1$ according to a channel measurement information result. Then, an act is carried out to select $i_3$ and respectively select values of the $i_3(1)$ and $i_3(2)$, the UE may select $i_3(1)=1$ and $i_3(2)=2$ according to the channel measurement result. The $X^{(p1)}$ and $X^{(p2)}$ are finally determined according to the results of $i_1$ and $i_3$. And $i_2=0$ may be selected.

At this moment, the UE may report RI=2 and report the PMI information I, J of the selected code word. Herein, reported information of I may include $i_1=1$, and reported information of J may include $i_3(1)=1$, $i_3(2)=2$ and $i_2=0$.

Alternatively, the UE may report the PMI information I, J of the selected code word. Herein, reported information of I may include $i_1=1$, $i_3(1)=1$ and $i_3(2)=2$, and reported information of J may include $i_2=0$.

Seventh Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under ranks 1-2 is as follows.

$$U_1 = \begin{bmatrix} v_0 \\ \beta v_1 \end{bmatrix} \quad U_2 = \begin{bmatrix} v_0 & v_2 \\ \beta v_1 & -\beta v_3 \end{bmatrix}$$

A certain adjustment is made for the above Formula, and the common factors are extracted out to obtain:

$$U'_1 = \frac{1}{4} \begin{bmatrix} v'_0 \\ \beta v'_1 \end{bmatrix} \quad U'_1 = \frac{1}{4} \begin{bmatrix} v'_0 \\ \beta v'_1 \end{bmatrix}$$

In the code word, $v'_0$, $v'_1$, $v'_2$ and $v'_3$ are all DFT vectors and are column vectors extracted from a matrix B, where the matrix B is defined as follows.

$$B = [b_0 \; b_1 \; L \; b_{31}], [B]_{1+m,1+n} = e^{j\frac{2\pi mn}{32}}, m = 0, 1, L, 7, n = 0, 1, L, 31$$

$$X^{(p)} \in \{[b_{2k \bmod 32} \; b_{(2k+1) \bmod 32} \; b_{(2k+2) \bmod 32} \; b_{(2k+3) \bmod 32}] : p = 0, 1, L, 15\}$$

The $i_1$ may be used for indicating information about a range to extract the DFT vectors in $v'_0$, $v'_1$, $v'_2$ and $v'_3$. The corresponding relationship between $i_1$ and $X^{(p)}$ is as shown in a Table B7-1.

TABLE B7-1

| | Including $X^{(p)}$ relationship $i_1$ Index | | | |
|---|---|---|---|---|
| $i_1$ Index | 0 | 1 | 2 | 3 |
| 0 | $X^{(0)}$ | $X^{(4)}$ | $X^{(8)}$ | $X^{(12)}$ |
| 1 | $X^{(1)}$ | $X^{(5)}$ | $X^{(9)}$ | $X^{(13)}$ |
| 2 | $X^{(2)}$ | $X^{(6)}$ | $X^{(10)}$ | $X^{(14)}$ |
| 3 | $X^{(3)}$ | $X^{(7)}$ | $X^{(11)}$ | $X^{(15)}$ |

The $i_3$ is used to determine, together with the $i_1$, a DFT vector range for vector selection and may include two parts, namely $i_3(1)$ and $i_3(2)$. The $i_2$ may be used for indicating information of the column vectors extracted from the $X^{(p)}$.

For the code word under rank 1, $i_3(1)$ is used to represent a DFT vector selection matrix $X^{Pi3(1)}$ of the vector $v'_0$ based on $i_1$; and $i_3(2)$ is used to represent a DFT vector selection matrix $X^{Pi3(2)}$ of the vector $i_2$ based on $i_1$.

For the code word under rank 2, $i_3(1)$ is used to represent a DFT vector selection matrix $X^{Pi3(1)}$ of the vectors $v'_0$ and $v'_1$ based on $i_1$, and $i_3(2)$ is used to represent a DFT vector selection matrix $X^{Pi3(2)}$ of the vectors $v'_2$ and $v'_3$ based on $i_1$.

The relationship between $i_3(1)$ and $i_3(2)$ is as shown in a Table B7-2.

TABLE B7-2

| Index | 0 | 1 | 2 | 3 |
|---|---|---|---|---|
| $i_3(1)$ | 1 | 2 | 3 | 4 |
| $i_3(2)$ | 2 | 3 | 4 | 1 |

The $i_2$ is represented as follows.
For the rank 1:

$$C_2 = \left\{ \begin{bmatrix} Y \\ Y \end{bmatrix}, \begin{bmatrix} Y \\ jY \end{bmatrix}, \begin{bmatrix} Y \\ -Y \end{bmatrix}, \begin{bmatrix} Y \\ -jY \end{bmatrix} \right\}, Y \in \{e_1^{\%}, e_2^{\%}, e_3^{\%}, e_4^{\%}\}$$

For the rank 2:

$$C_2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\},$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

The UE may select a value of $i_1$ to be $i_1=1$ according to a channel measurement information result. Then, an act is carried out to select $i_3$, as there exists a fixed relationship between the $i_3(1)$ and $i_3(2)$, the UE may only need to report a common index and may select $i_3=2$ according to the channel measurement result. The selected $X^{(p1)}$ and $X^{(p2)}$ are finally determined according to the results of $i_1$ and $i_3$. Thereafter, $i_2$ may be selected.

It is assumed that the code word selected by the UE is a code word under rank 2, and the $i_2=3$ may be selected.

At this moment, the UE may report RI=2 and report the PMI information I, J of the selected code word. Herein, reported information of I may include $i_1=1$, and reported information of J may include $i_3=2$ and $i_2=3$.

Eighth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under ranks 1-2 is as follows.

$$U_1 = \begin{bmatrix} v_0 \\ \beta v_1 \end{bmatrix} \quad U_2 = \begin{bmatrix} v_0 & v_2 \\ \beta v_1 & -\beta v_3 \end{bmatrix}$$

A certain adjustment is made for the above Formula, and the common factors are extracted out to obtain:

$$U_1' = \frac{1}{4}\begin{bmatrix} v_0' \\ \beta v_1' \end{bmatrix} \quad U_2' = \frac{1}{4\sqrt{2}}\begin{bmatrix} v_0' & v_2' \\ \beta v_1' & -\beta v_3' \end{bmatrix}$$

In the code word, $v'_0$, $v'_1$, $v'_2$ and $v'_3$ are all DFT vectors and are column vectors extracted from a matrix B, where the matrix B is defined as follows.

$$B = [b_0 \; b_1 \; L \; b_{31}], [B]_{1+m,1+n} = e^{j\frac{2\pi mn}{32}}, m = 0, 1, L, 7, n = 0, 1, L, 31$$

$$X^{(p)} \in \{[b_{2k \bmod 32} \; b_{(2k+1) \bmod 32} \; b_{(2k+2) \bmod 32} \; b_{(2k+3) \bmod 32}]: p = 0, 1, L, 15\}$$

The $i_1$ may be used for indicating information about a range to extract the DFT vectors in $v'_0$, $v'_1$, $v'_2$ and $v'_3$. The corresponding relationship between $i_1$ and $X^{(p)}$ is as shown in a Table B8-1.

TABLE B8-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(4)}$ | $X^{(8)}$ | $X^{(12)}$ |
| 1 | $X^{(1)}$ | $X^{(5)}$ | $X^{(9)}$ | $X^{(13)}$ |
| 2 | $X^{(2)}$ | $X^{(6)}$ | $X^{(10)}$ | $X^{(14)}$ |
| 3 | $X^{(3)}$ | $X^{(7)}$ | $X^{(11)}$ | $X^{(15)}$ |

The $i_3$ is used to determine, a DFT vector range for vector selection and may include two parts, namely $i_3(1)$ and $i_3(2)$, both of which having the same meaning with the foregoing embodiments. The $i_2$ may be used for indicating information of the column vectors extracted from the $X^{(p)}$ and may be divided into two parts, namely $i_2(1)$ and $i_2(2)$. $i_2(1)$ is used to represent a column vector extracted based on $i_1$ and $i_3(1)$ selection matrix $X^{Pi_3(1)}$, and $i_2(2)$ is used to represent a column vector extracted based on and $i_3(2)$ selection matrix $X^{Pi_3(2)}$.

The relationship between $i_2(1)$ and $i_2(2)$ is as shown in a Table B8-2.

TABLE B8-2

| Table 8-2 | | | | |
|---|---|---|---|---|
| Index | 0 | 1 | 2 | 3 |
| $i_2(1)$ | 1 | 2 | 3 | 4 |
| $i_2(2)$ | 3 | 4 | 1 | 2 |

The relationship between $i_2(1)$ and $i_2(2)$ under rank 1 is as shown in a Table B8-3.

TABLE B8-3

| Index | 0 | 1 | 2 | 3 |
|---|---|---|---|---|
| $I_2(1)$ | $\tilde{e}_\varphi$ | $\tilde{e}_\varphi$ | $\tilde{e}_\varphi$ | $\tilde{e}_\varphi$ |
| $I_2(2)$ | $\tilde{e}_\varphi$ | $\tilde{e}_\varphi$ | $\tilde{e}_\varphi$ | $\tilde{e}_\varphi$ |

For the rank 2:

$$C_{i_2(1)} = \left\{ \begin{bmatrix} Y_1 \\ Y_1' \end{bmatrix} \begin{bmatrix} Y_1 \\ -Y_1' \end{bmatrix} \right\} \quad C_{i_2(2)} = \left\{ \begin{bmatrix} Y_2 \\ -Y_2' \end{bmatrix} \begin{bmatrix} Y_2 \\ -jY_2' \end{bmatrix} \right\}$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\}$ Where, $e_l$ is an lth column in a unit matrix and indicates to extract the lth column from the matrix $X^{(p)}$ to serve as a DFT vector of a matrix U.

The UE may select a value of $i_1$ to be $i_1=1$ according to a channel measurement information result. Then, an act is carried out to select $i_3$, $i_3(1)=0$ and $i_3(2)=1$ are selected. The UE finally determines the selected $X^{(p1)}$ and $X^{(p2)}$ according to the results of $i_1$ and $i_3$. And then, an act is carried out to select $i_2$, as the relationship between $i_2(1)$ and $i_2(2)$ is determined, the UE may only need to report a common index.

It is assumed that the code word selected by the UE is a code word under rank 2, and the $i_2=3$ may be selected.

At this moment, the UE may report RI=2 and report the PMI information I, J of the selected code word. Herein, reported information of I may include $i_1=1$, and reported information of J may include $i_3(1)=0$, $i_3(2)=1$ and $i_2=3$.

Ninth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 2 is as follows.

$$U_2 = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix}$$

In the code word, the v'$_0$, v'$_1$, v'$_2$, v'$_3$, v'$_4$, v'$_5$, v'$_6$ and v'$_7$ are all DFT vectors and are column vectors extracted from a matrix B', where B' is defined as follows.

$$B' = [b_0 \ b_1 \ L \ b_{31}], [B']_{1+m,1+n} = e^{j\frac{2\pi mn}{32}}, m = 0, 1, 2, 3, n = 0, 1, L, 31$$

$$X^{(p)} \in \{[b_{k \bmod 32} \ b_{(k+8) \bmod 32} \ b_{(k+16) \bmod 32} \ b_{(k+24) \bmod 32}]: p = 0, 1, L, 15\}$$

The i$_1$ may be used for indicating information about a range to extract the DFT vectors in the v'$_0$, v'$_1$, v'$_2$, v'$_3$, v'$_4$, v'$_5$, v'$_6$ and v'$_7$. The corresponding relationship between i$_1$ and X$^{(p)}$ is as shown in a Table B9-1.

TABLE B9-1

| i$_1$ Index | Including X$^{(p)}$ relationship i$_3$ Index | | | |
|---|---|---|---|---|
| | 0 | 1 | 2 | 3 |
| 0 | X$^{(0)}$ | X$^{(1)}$ | X$^{(2)}$ | X$^{(3)}$ |
| 1 | X$^{(4)}$ | X$^{(5)}$ | X$^{(6)}$ | X$^{(7)}$ |
| 2 | X$^{(8)}$ | X$^{(9)}$ | X$^{(10)}$ | X$^{(11)}$ |
| 3 | X$^{(12)}$ | X$^{(13)}$ | X$^{(14)}$ | X$^{(15)}$ |

The i$_3$ is used to determine, together with the i$_1$, a DFT vector range for vector selection and may include four parts, namely i$_3$(1), i$_3$(2), i$_3$(3) and i$_3$(4), where i$_3$(1) may be used for indicating information on a DFT vector selection matrix X$^{(i_3(1))}$ of the vectors v'$_0$ and v'$_4$ based on i$_1$; i$_3$(2) may be used for indicating information on a DFT vector selection matrix X$^{(i_3(2))}$ of the vectors v'$_1$ and v'$_5$ based on i$_1$; i$_3$(3) may be used for indicating information on a DFT vector selection matrix X$^{(i_3(3))}$ of the vectors v'$_2$ and v'$_6$ based on i$_1$; and i$_3$(4) may be used for indicating information on a DFT vector selection matrix X$^{(i_3(4))}$ of the vectors v'$_3$ and v'$_7$ based on i$_1$.

The i$_2$ may be used for indicating information of the column vectors extracted from the X$^{(p)}$, may have phase α or β information and may include four parts. Specifically, i$_2$(1) is used to represent a column vector based on i$_1$ and extracted under i$_3$(1); i$_2$(2) is used to represent a column vector based on i$_1$ and extracted under i$_3$(2); i$_2$(3) is used to represent a column vector based on i$_1$ and extracted under i$_3$(3) and i$_2$(4) is used to represent a column vector based on i$_1$ and extracted under i$_3$(4). When the UE reports the CSI, i$_3$(1)=i$_3$(2), i$_3$(3)=i$_3$(4) and i$_2$(1)=i$_2$(2), i$_2$(3)=i$_2$(4) are selected.

For the rank 2:

$$C_2 = \left\{ \begin{bmatrix} Y_1 & Y'_1 \\ Y_2 & Y'_2 \\ Y_3 & Y'_3 \\ Y_4 & Y'_4 \end{bmatrix} \begin{bmatrix} Y_1 & Y'_1 \\ Y_2 & Y'_2 \\ jY_3 & -jY'_3 \\ jY_4 & -jY'_4 \end{bmatrix} \begin{bmatrix} Y_1 & Y'_1 \\ e^{j\frac{\pi}{4}}Y_2 & e^{j\frac{\pi}{4}}Y'_2 \\ Y_3 & Y'_3 \\ e^{j\frac{\pi}{4}}Y_4 & e^{j\frac{\pi}{4}}Y'_4 \end{bmatrix} \begin{bmatrix} Y_1 & Y'_1 \\ e^{j\frac{\pi}{4}}Y_2 & e^{j\frac{\pi}{4}}Y'_2 \\ jY_3 & -jY'_3 \\ j \cdot e^{j\frac{\pi}{4}}Y_4 & -j \cdot e^{j\frac{\pi}{4}}Y'_4 \end{bmatrix} \right\}$$

$Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4) (\tilde{e}_1, \tilde{e}_2), (\tilde{e}_2, \tilde{e}_3), (\tilde{e}_1, \tilde{e}_4), (\tilde{e}_2, \tilde{e}_4)\} i \in \{1, 2, 3, 4\}$ Where, e$_l$ is an lth column in a unit matrix.

The UE may select a value of i$_1$ to be i$_1$=0 according to a channel measurement information result. Then, an act is carried out to select i$_3$ and respectively select the values of i$_3$(1), i$_3$(2), i$_3$(3) and i$_3$(4), the UE may select i$_3$(1)=i$_3$(2)=2 and i$_3$(3)=i$_3$(4)=0 according to the channel measurement result. The selected X$^{(P1)}$, X$^{(P2)}$, X$^{(P3)}$ and X$^{(P4)}$ are finally determined according to the results of i$_1$ and i$_3$. Thereafter, i$_2$ may be selected.

It is assumed that the code word selected by the UE is a code word under rank 2, and i$_2$(1)=i$_2$(2)=1 and i$_2$(3)=i$_2$(4)=0 are selected.

At this moment, the UE may report RI=2 and report the PMI information I, J of the selected code word. Herein, reported information of I may include i$_1$=1, and reported information of J may include i$_3$(1)=2, i$_3$(3)=0, i$_2$(1)=1 and i$_2$(3)=0.

Tenth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 1 is as follows.

$$U_1 = \begin{bmatrix} v_0 \\ \alpha v_1 \\ \beta v_2 \\ \alpha\beta v_3 \end{bmatrix}$$

In the code word, the v$_0$, v$_1$, v$_2$ and v$_3$ are all DFT vectors and are column vectors extracted from a matrix B', where B' is defined as follows.

$$B' = [b_0 \ b_1 \ L \ b_{31}], [B']_{1+m,1+n} = e^{j\frac{2\pi mn}{32}}, m = 0, 1, 2, 3, n = 0, 1, L, 31$$

$$X^{(p)} \in \{[b_{k \bmod 32} \ b_{(k+8) \bmod 32} \ b_{(k+16) \bmod 32} \ b_{(k+24) \bmod 32}]: p = 0, 1, L, 15\}$$

The i$_1$ may be used for indicating information about a range to extract the DFT vectors in the v$_0$, v$_1$, v$_2$ and v$_3$. The corresponding relationship between i$_1$ and X$^{(p)}$ is as shown in a Table B10-1.

TABLE B10-1

| i$_1$ Index | Including X$^{(p)}$ relationship i$_3$ Index | | | |
|---|---|---|---|---|
| | 0 | 1 | 2 | 3 |
| 0 | X$^{(0)}$ | X$^{(1)}$ | X$^{(2)}$ | X$^{(3)}$ |
| 1 | X$^{(4)}$ | X$^{(5)}$ | X$^{(6)}$ | X$^{(7)}$ |
| 2 | X$^{(8)}$ | X$^{(9)}$ | X$^{(10)}$ | X$^{(11)}$ |
| 3 | X$^{(12)}$ | X$^{(13)}$ | X$^{(14)}$ | X$^{(15)}$ |

The i$_3$ is used to determine, together with the i$_1$, a DFT vector range for vector selection and may include two parts, namely i$_3$(1) and i$_3$(2). Specifically, i$_3$(1) may be used for indicating information on a DFT vector selection matrix $X^{(i_3(1))}$ of the vectors $v_0$ and $v_1$ based on $i_1$; and $i_3(2)$ may be used for indicating information on a DFT vector selection matrix $X^{(i_3(2))}$ of the vectors $v_2$ and $v_3$ based on $i_1$.

The $i_2$ may be used for indicating information of the column vectors extracted from the $X^{(p)}$ and may have phase α or β information.

$$C_2 = \left\{ \begin{bmatrix} Y_1 \\ Y_1 \\ Y_2 \\ Y_2 \end{bmatrix} \begin{bmatrix} Y_1 \\ Y_1 \\ jY_2 \\ jY_2 \end{bmatrix} \begin{bmatrix} Y \\ jY_1 \\ Y_2 \\ jY_2 \end{bmatrix} \begin{bmatrix} Y \\ jY_1 \\ -Y_2 \\ -jY_2 \end{bmatrix} \right\}$$

$(Y_1, Y_2) \in \{(e_1, e_2)\ (e_2, e_3)\ (e_1, e_4)\ (e_2, e_4)\} \in \{1\ 2\ 3\ 4\}$

Where, $e_l$ is an lth column in a unit matrix.

The UE may select a value of $i_1$ to be $i_1=0$ according to a channel measurement information result. Then, an act is carried out to select $i_3$ and respectively select the values of the $i_3(1)$ and $i_3(2)$, the UE may select $i_3(1)=2$ and $i_3(2)=0$ according to the channel measurement result. The selected $X^{(p1)}$ and $X^{(p2)}$ are finally determined according to the results of $i_1$ and $i_3$. Thereafter, the $i_2=1$ may be selected.

At this moment, the UE may report RI=1 and report the PMI information I, J of the selected code word. Herein, reported information of I may include $i_1=0$, and reported information of J may include $i_3(1)=2$, $i_3(2)=0$ and $i_2=1$.

Eleventh Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 1 is as follows.

$$U_1 = \begin{bmatrix} v_0 \\ \alpha v_1 \\ \beta v_2 \\ \alpha\beta v_3 \end{bmatrix}$$

In the code word, $v_0$, $v_1$, $v_2$ and $v_3$ are all DFT vectors and are column vectors extracted from a matrix B', where B' is defined as follows.

$B' = [b_0\ b_1\ L\ b_{31}]$, $[B']_{1+m,1+n} = e^{j\frac{2\pi mn}{32}}$, $m = 0, 1, 2, 3, n = 0, 1, L, 31$ $X^{(p)} \in \{[b_{k\bmod 32}\ b_{(k+8)\bmod 32}\ b_{(k+16)\bmod 32}\ b_{(k+24)\bmod 32}]: p = 0, 1, L, 15\}$ The $i_1$ may be used for indicating information about a range to extract the DFT vectors in the $v_0$, $v_1$, $v_2$ and $v_3$. The corresponding relationship between $i_1$ and $X^{(p)}$ is as shown in a Table B11-1.

TABLE B11-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(1)}$ | $X^{(2)}$ | $X^{(3)}$ |
| 1 | $X^{(4)}$ | $X^{(5)}$ | $X^{(6)}$ | $X^{(7)}$ |
| 2 | $X^{(8)}$ | $X^{(9)}$ | $X^{(10)}$ | $X^{(11)}$ |
| 3 | $X^{(12)}$ | $X^{(13)}$ | $X^{(14)}$ | $X^{(15)}$ |

The $i_3$ is used to determine, together with the $i_1$, a DFT vector range for vector selection and may include two parts, namely $i_3(1)$ and $i_3(2)$. Specifically, $i_3(1)$ may be used for indicating information on a DFT vector selection matrix $X^{(i_3(1))}$ of the vectors $v_0$ and $v_1$ based on $i_1$, and $i_3(2)$ may be used for indicating information on a DFT vector selection matrix $X^{(i_3(2))}$ of the vectors $v_2$ and $v_3$ based on $i_1$.

The $i_2$ may be used for indicating information of the column vectors extracted from the $X^{(p)}$, may have phase α or β information and may include two parts, namely $i_2(1)$ and $i_2(2)$. Specifically, $i_2(1)$ indicates a DFT vector selected based on $i_1$ and $i_3(1)$ for the vectors $v_0$ and $v_1$; and $i_2(2)$ indicates a DFT vector selected based on $i_3(2)$ for the vectors $v_2$ and $v_3$.

$$C_2 = \left\{ \begin{bmatrix} Y_1 \\ Y_1' \\ Y_2 \\ Y_2' \end{bmatrix} \begin{bmatrix} Y_1 \\ Y_1' \\ jY_2 \\ jY_2' \end{bmatrix} \begin{bmatrix} Y \\ jY_1' \\ Y_2 \\ jY_2' \end{bmatrix} \begin{bmatrix} Y \\ jY_1' \\ -Y_2 \\ -jY_2' \end{bmatrix} \right\}$$

$Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4)\ (\tilde{e}_1, \tilde{e}_2), (\tilde{e}_2, \tilde{e}_3), (\tilde{e}_1, \tilde{e}_4), (\tilde{e}_2, \tilde{e}_4)\} i \in \{1, 2, 3, 4\}$ Where, $e_l$ is an lth column in a unit matrix.

The UE may select a value of $i_1$ to be $i_1=1$ according to a channel measurement information result. Then, an act is carried out to select $i_3$ and respectively select the values of the $i_3(1)$ and $i_3(2)$, the UE may select $i_3(1)=2$ and $i_3(2)=0$ according to the channel measurement result. The selected $X^{(p1)}$ and $X^{(p2)}$ are finally determined according to the results of $i_1$ and $i_3$. Thereafter, $i_2(1)=5$ and $i_2(2)=1$ are selected.

At this moment, the UE may report RI=1 and report the PMI information I, J of the selected code word. Herein, reported information of I may include $i_1=0$, and reported information of J may include $i_3(1)=0$, $i_3(2)=2$, $i_2(1)=5$ and $i_2(2)=1$.

Twelfth Embodiment

The eNB is provided with sixteen antennas and the UE is provided with two receiving antennas. The eNB may send a channel state measurement pilot frequency of 16Tx to the UE, and the UE may perform a channel measurement according to the received measurement pilot frequency and may feed back the CSI information including PMI information to the eNB.

The codebook structure of the 16Tx under rank 1 is as follows.

$$U_1 = \begin{bmatrix} v_0 \\ \alpha v_1 \\ \beta v_2 \\ \alpha\beta v_3 \end{bmatrix}$$

In the code word, $v_0$, $v_1$, $v_2$ and $v_3$ are all DFT vectors and are column vectors extracted from a matrix B', where B' is defined as follows.

$$B' = [b_0 \ b_1 \ L \ b_{31}], \ [B']_{1+m,1+n} = e^{j\frac{2\pi mn}{32}}, m = 0, 1, 2, 3, n = 0, 1, L, 31$$

$$X^{(p)} \in \{[b_{k \bmod 32} \ b_{(k+8) \bmod 32} \ b_{(k+16) \bmod 32} \ b_{(k+24) \bmod 32}]: p = 0, 1, L, 15\}$$

The $i_1$ may be used for indicating information about a range to extract the DFT vectors in $v_0$, $v_1$, $v_2$ and $v_3$. The corresponding relationship between $i_1$ and $X^{(p)}$ is as shown in a Table B12-1.

TABLE B12-1

| $i_1$ Index | Including $X^{(p)}$ relationship $i_3$ Index | | | |
|---|---|---|---|---|
| | 0 | 1 | 2 | 3 |
| 0 | $X^{(0)}$ | $X^{(1)}$ | $X^{(2)}$ | $X^{(3)}$ |
| 1 | $X^{(4)}$ | $X^{(5)}$ | $X^{(6)}$ | $X^{(7)}$ |
| 2 | $X^{(8)}$ | $X^{(9)}$ | $X^{(10)}$ | $X^{(11)}$ |
| 3 | $X^{(12)}$ | $X^{(13)}$ | $X^{(14)}$ | $X^{(15)}$ |

The $i_3$ is used to determine, together with the $i_1$, a DFT vector range for vector selection and may include two parts, namely $i_3(1)$ and $i_3(2)$. Specifically, $i_3(1)$ may be used for indicating information on a DFT vector selection matrix $X^{(i_3(1))}$ of the vectors $v_0$ and $v_1$ based on $i_1$, and $i_3(2)$ may be used for indicating information on a DFT vector selection matrix $X^{(i_3(2))}$ of the vectors $v_2$ and $v_3$ based on $i_1$.

The $i_2$ may be used for indicating information of the column vectors extracted from the $X^{(p)}$, may have phase $\alpha$ or $\beta$ information and may include two parts, namely $i_2(1)$ and $i_2(2)$. Specifically, $i_2(1)$ indicates a DFT vector selected based on $i_1$ and $i_3(1)$ for the vectors $v_0$ and $v_2$; and $i_2(2)$ indicates a DFT vector selected based on $i_1$ and $i_3(2)$ for the vectors $v_1$ and $v_3$.

$$C_2 = \left\{ \begin{bmatrix} Y_1 \\ Y_1' \\ Y_2 \\ Y_2' \end{bmatrix} \begin{bmatrix} Y_1 \\ Y_1' \\ jY_2 \\ jY_2' \end{bmatrix} \begin{bmatrix} Y_1 \\ jY_1' \\ Y_2 \\ jY_2' \end{bmatrix} \begin{bmatrix} Y_1 \\ jY_1' \\ -Y_2 \\ -jY_2' \end{bmatrix} \right\}$$

$Y_1, Y_2 \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\} i \in \{1, 2, 3, 4\}$ Where, $e_l$ is an lth column in a unit matrix.

The UE may select a value of $i_1$ to be $i_1=1$ according to a channel measurement information result. Then, an act is carried out to select $i_3$ and respectively select the values of the $i_3(1)$ and $i_3(2)$, the UE may select $i_3(1)=0$ and $i_3(2)=2$ according to the channel measurement result. The selected $X^{(p_1)}$ and $X^{(p_2)}$ are finally determined according to the results of $i_1$ and $i_3$. Thereafter, $i_2(1)=5$ and $i_2(2)=1$ are selected.

At this moment, the UE may report RI=1 and report the PMI information I, J of the selected code word. Herein, reported information of I may include $i_1=0$, and reported information of J may include $i_3(1)=0$, $i_3(2)=2$, $i_2(1)=5$ and $i_2(2)=1$.

The codebook obtained by multiplying the code word under rank 1 and the code word under rank 2 by any nonzero plural is equivalent to that before being changed.

The codebook formed after the code word under rank 1 and the code word under rank 2 are subjected to any column transformation, or are multiplied by a constant coefficient, or all code words are jointly subjected to the row transformation is equivalent to that before being transformed.

The codebook formed after any column in the code word under rank 1 and the code word under rank 2 is multiplied by $e^{j\phi}$ is equivalent to that before being transformed, where $\phi$ is any nonzero real number.

In conclusion, the exemplary embodiments of the present disclosure provide a method for feeding back CSI in a multi-input multi-output system. The method may include the following acts.

A UE may obtain codebook index information.

The UE may feed back the CSI including the codebook index information to an eNodeB.

The codebook index information may include: a first type of codebook index set I and a second type of codebook index set J. A combination of the first type of index set I and the second type of index set J may be used for indicating a precoding matrix U. The precoding matrix U is an $N_t \times r$ matrix, where $N_t$ represents a total number of ports or a total number of antennas and r represents a number of transmission layers. The precoding matrix U may be composed of at least $Q \times r$ basic vectors having a dimension of $N_t/Q$, where $Q \geq 2$, $r \geq 1$, and Q and r are both positive integers. The basic vectors may be columns extracted from a matrix B composed of M columns of $N_t/Q$-dimensional vectors, where M may be a positive integer.

A union of the first type of index set I and the second type of index set J may at least include codebook indication information $i_1$, $i_2$ and $i_3$.

The codebook indication information $i_1$ may be used for representing selection information of K matrixes $W_{i_1,l} L W_{i_1,k}$, where K may be a positive integer, each column of the K matrixes $W_{i_1,l} L W_{i_1,k}$ may be extracted from column vectors included in the matrix B. The codebook indication information $i_3$ may be used for representing a matrix $W_{i_1,l}$ selected from the K matrixes. The codebook indication information $i_2$ may be used for representing information of one or more basic vectors extracted from the matrix $W_{i_1,l}$ and used to construct the precoding matrix U.

Alternatively, the codebook index information may include: a first type of codebook index set I and a second type of codebook index set J. A combination of the first type of index set I and the second type of index set J may be used for indicating a precoding matrix U. A union of the first type of index set I and the second type of index set J may at least include codebook indication information $i_1$, $i_2$ and $i_3$. The precoding matrix may meet a model: $U = W_1 \cdot W_2$, where U is an $N_t \times r$ matrix, $N_t$ represents a total number of ports or a total number of antennas and r represents a number of transmission layers.

The codebook indication information $i_1$ may be used for representing selection information of K matrixes $W_{i_1,l} L$ $WW_{i_1,k}$. The codebook indication information $i_3$ may be used for representing a matrix $W_{i_1,l}$ selected from the K matrixes. The codebook indication information $i_1$ and $i_3$ may jointly indicate $W_1$ information. The codebook indication information $i_2$ may be used for representing $W_2$ information. The codebook indication information $i_1$, $i_2$, $i_3$ may jointly determine a precoding code word matrix U.

According to the method provided by the exemplary embodiments of the present disclosure, the code word may be not only suitable for the correlated channels, but also suitable for the uncorrelated channels. It may be ensured that the code word may achieve a relatively good performance when the $W_1$ is wrongly selected. Furthermore, when the channel changes slowly in a cycle, the code word may still be changed; and thus, the good adaptability may be achieved.

Figure 2:
FIG. 2 is a structural diagram of a device for feeding back CSI in a multi-input multi-output system according to an embodiment of the present disclosure.

FIG. 2 is a structure diagram of a device for feeding back CSI in a multi-input multi-output system. The device may include: a first obtaining module 201 and a first sending module 202.

The first obtaining module 201 may be configured to obtain codebook index information.

The first sending module 202 may be configured to feed back the CSI including the codebook index information to an eNodeB.

The codebook index information may include: a first type of codebook index set I and a second type of codebook index set J. A combination of the first type of index set I and the second type of index set J may be used for indicating a precoding matrix U. The precoding matrix U is an $N_t \times r$ matrix, where $N_t$ represents a total number of ports or a total number of antennas and r represents a number of transmission layers. The precoding matrix U may be composed of at least Q×r basic vectors having a dimension of $N_t/Q$, where $Q \geq 2$, $r \geq 1$, and Q and r are both positive integers. The basic vectors may be columns extracted from a matrix B composed of M columns of $N_t/Q$-dimensional vectors, where M may be a positive integer.

A union of the first type of index set I and the second type of index set J may at least include codebook indication information $i_1$, $i_2$ and $i_3$.

The codebook indication information $i_1$ may be used for representing selection information of K matrixes $W_{i_1}L\ W_{i_1,k}$, where K may be a positive integer, each column of the K matrixes $W_{i_1}L\ W_{i_1,k}$ may be extracted from column vectors included in the matrix B. The codebook indication information $i_3$ may be used for representing a matrix $W_{i_1,l}$ selected from the K matrixes. The codebook indication information $i_2$ may be used for representing information of one or more basic vectors extracted from the matrix $W_{i_1,l}$ and used to construct the precoding matrix U.

In an exemplary embodiment, the precoding matrix U may meet a model:

$$U = \begin{bmatrix} v_0 \\ \beta v_1 \end{bmatrix} \text{ or } U = \begin{bmatrix} v'_0 \\ \alpha v'_1 \\ \beta v'_2 \\ \alpha\beta v'_3 \end{bmatrix} \text{ or } U = \begin{bmatrix} v_0 & v_2 \\ \beta v_1 & -\beta v_3 \end{bmatrix} \text{ or }$$

$$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

Where vectors $v_0$, $v_1$, $v_2$ and $v_3$ may be vectors having a dimension of $N_t/2 \times 1$, vectors $v'_0$, $v'_1$, $v'_2$, $v'_3$, $v'_4$, $v'_5$, $v'_6$ and $v'_7$, may be vectors having a dimension of $N_t/4 \times 1$, $\alpha = e^{j\theta_1}$, $\beta = e^{j\theta_2}$, where $0 \leq \theta_1 \leq 2\pi$, $0 \leq \theta_2 \leq 2\pi$.

In an exemplary embodiment, the first type of codebook index set I may at least include $i_1$ and $i_3$ information; the second type of codebook index set J may at least include $i_2$ information.

In an exemplary embodiment, the first type of codebook index set I may at least include $i_1$ and $i_2$ information; the second type of codebook index set J may at least include $i_3$ information.

In an exemplary embodiment, the first type of codebook index set I may at least include $i_1$ information; the second type of codebook index set J may at least include $i_2$ and $i_3$ information.

In an exemplary embodiment, the basic vectors composing the precoding matrix U may be divided into N1 groups. The codebook indication information $i_3$ may include N1 pieces of sub-information $i_3(1)L\ i_3(N1)$ $N1 \geq 2$ and may be a positive integer. The codebook indication information $i_3(x)$ may be used for representing information of a matrix $W_{i_1,l_x}$ selected for an Xth group of vectors from the K matrixes $W_{i_1}L\ W_{i_1,k}$ indicated by $i_1$, where $2 \leq x \leq N1$.

In an exemplary embodiment, the basic vectors composing the precoding matrix U may be divided into N2 groups. The codebook indication information $i_2$ may include N2 pieces of sub-information $i_2(1)L\ i_2(N2)$ $N2 \geq 2$ where $i_2(y)$ may be used for representing information of one or more basic vectors extracted from a matrix $W_{i_1,l_y}$ jointly indicated by $i_1$ and $i_3$ and used to construct the precoding matrix U, $2 \leq y \leq N2$.

In an exemplary embodiment, for the codebook model $$U = \begin{bmatrix} v'_0 \\ \alpha v'_1 \\ \beta v'_2 \\ \alpha\beta v'_3 \end{bmatrix} \text{ or } U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

at least one of the codebook indication information $i_1$, $i_2$ and $i_3$ may be further used to represent $\alpha$ information in the codebook model U.

In an exemplary embodiment, at least one of the codebook indication information $i_1$, $i_2$ and $i_3$ may be further used to represent $\beta$ information in the codebook model U.

In an exemplary embodiment, for the model $$U = \begin{bmatrix} v_0 & v_2 \\ \beta v_1 & -\beta v_3 \end{bmatrix},$$

the codebook indication information $i_3$ may include two pieces of sub-information $i_3(1)$ and $i_3(2)$.

In an exemplary embodiment, $i_3(1)$ may be used for representing information of a matrix $W_{i_1,i_3(1)}$ from which vectors $v_0$ and $v_2$ are extracted; and $i_3(2)$ may be used for representing information of a matrix $W_{i_1,i_3(2)}$ from which vectors $v_1$ and $v_3$ are extracted.

In an exemplary embodiment, $i_3(1)$ may be used for representing information of a matrix $W_{i_1,i_3(1)}$ from which vectors $v_0$ and $v_1$ are extracted; and $i_3(2)$ may be used for representing information of a matrix $W_{i_1,i_3(2)}$ from which vectors $v_2$ and $v_3$ are extracted.

In an exemplary embodiment, for the model $$U = \begin{bmatrix} v'_0 \\ \alpha v'_1 \\ \beta v'_2 \\ \alpha\beta v'_3 \end{bmatrix},$$

the codebook indication information $i_3$ may include two pieces of sub-information $i_3(1)$ and $i_3(2)$.

In an exemplary embodiment, $i_3(1)$ may be used for representing information of a matrix $W_{i_1i_3(1)}$ from which vectors $v'_0$ and $v'_1$ are extracted; and $i_3(2)$ may be used for representing information of a matrix $W_{i_1i_3(2)}$ from which vectors $v'_2$ and $v'_3$ are extracted.

In an exemplary embodiment, $i_3(1)$ may be used for representing information of a matrix $W_{i_1i_3(1)}$ from which vectors $v'_0$ and $v'_2$ are extracted; and $i_3(2)$ may be used for representing information of a matrix $W_{i_1l}$ for vectors $v'_1$ and $v'_3$.

For the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_3$ may include four pieces of sub-information $i_3(1)$, $i_3(2)$, $i_3(3)$ and $i_3(4)$. Specifically, $i_3(1)$ may be used for representing information of a matrix $W_{i_1i_3(1)}$ from which vectors $v'_0$ and $v'_4$ are extracted; $i_3(2)$ may be used for representing information of a matrix $W_{i_1i_3(2)}$ from which vectors $v'_1$ and $v'_5$ are extracted; $i_3(3)$ may be used for representing information of a matrix $W_{i_1i_3(3)}$ from which vectors $v'_2$ and $v'_6$ are extracted; and $i_3(4)$ may be used for representing information of a matrix $W_{i_1i_3(4)}$ from which vectors $v'_3$ and $v'_7$ are extracted.

For the model $$U = \begin{bmatrix} v'_0 \\ \alpha v'_1 \\ \beta v'_2 \\ \alpha\beta v'_3 \end{bmatrix},$$

the codebook indication information $i_2$ may include two pieces of sub-information $i_2(1)$ and $i_2(2)$.

In the exemplary embodiment, $i_2(1)$ may be used for representing information of a basic vector extracted from the matrix $W_{i_1l}$ for vectors and $v'_0$ $v'_1$; and $i_2(2)$ may be used for representing information of a basic vector extracted from the matrix $W_{i_1l}$ for vectors $v'_2$ and $v'_3$.

Alternatively, $i_2(1)$ may be used for representing information of a basic vector extracted from the matrix $W_{i_1l}$ for vectors $v'_0$ and $v'_2$ and $i_2(2)$ may be used for representing information of a basic vector extracted from the matrix $W_{i_1l'}$ for vectors and $v'_1$ and $v'_3$.

For the model $$U = \begin{bmatrix} v_0 & v_2 \\ \beta v_1 & -\beta v_3 \end{bmatrix},$$

the codebook indication information $i_2$ may include two pieces of sub-information $i_2(1)$ and $i_2(2)$.

In an exemplary embodiment, $i_2(1)$ may be used for representing information of a basic vector extracted from the matrix $W_{i_1l}$ for vectors $v_0$ and $v_2$; and $i_2(2)$ may be used for representing information of a basic vector extracted from the matrix $W_{i_1l}$ for vectors $v_1$ and $v_3$.

Alternatively, $i_2(1)$ may be used for representing information of a basic vector extracted from the matrix $W_{i_1l}$ for vectors $v_0$ and $v_1$; and $i_2(2)$ may be used for representing information of a basic vector extracted from the matrix $W_{i_1l'}$ for vectors $v_2$ and $v_3$.

For the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ may include four pieces of sub-information $i_2(1)$, $i_2(2)$, $i_2(3)$ and $i_2(4)$.

In an exemplary embodiment, $i_2(1)$ may be used for representing information of a basic vector extracted from the matrix $W_{i_1l}$ for vectors $v'_0$ and $v'_4$; $i_2(2)$ may be used for representing information of a basic vector extracted from the matrix $W_{i_1l}$ for vectors $v'_1$ and $v'_5$; $i_2(3)$ may be used for representing information of a basic vector extracted from the matrix $W_{i_1l}$ for vectors $v'_2$ and $v'_6$; and $i_2(4)$ may be used for representing information of a basic vector extracted from the matrix $W_{i_1l''}$ for vectors $v'_3$ and $v'_7$.

For the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ may include four pieces of sub-information $i_2(1)$, $i_2(2)$, $i_2(3)$ and $i_2(4)$.

In an exemplary embodiment, $i_2(1)$ may be used for representing information of a basic vector extracted from the matrix $W_{i_1l}$ for vectors $v'_0$ and $v'_1$; $i_2(2)$ may be used for representing information of a basic vector extracted from the matrix w for vectors $v'_2$ and $v'_3$; $i_2(3)$ may be used for representing information of a basic vector extracted from the matrix $W_{i_1l''}$ for vectors $v'_4$ and $v'_5$; and $i_2(4)$ may be used for representing information of a basic vector extracted from the matrix $W_{i_1l'''}$ for vectors $v'_6$ and $v'_7$.

Alternatively, $i_2(1)$ may be used for representing information of a basic vector extracted from the matrix $W_{i_1l}$ for vectors $v'_0$ and $v'_2$; $i_2(2)$ may be used for representing information of a basic vector extracted from the matrix $W_{i_1l}$ for vectors $v'_1$ and $v'_3$; $i_2(3)$ may be used for representing information of a basic vector extracted from the matrix $W_{i_1l'}$ for vectors $v'_4$ and $v'_6$; and $i_2(4)$ may be used for representing information of a basic vector extracted from the matrix $W_{i_1l''}$ for vectors $v'_5$ and $v'_7$.

The $i_3(1)$L $i_3(N1)$ may have a linear relationship. When the CSI is reported, the first sending module 202 may at least report one codebook indication information in $i_3(1)$L $i_3(N1)$.

The $i_2(1)$L $i_2(N2)$ may have a linear relationship. When the CSI is reported, the first sending module 202 may at least report one codebook indication information in $i_2(1)$L $i_2(N2)$.

In an exemplary embodiment, $i_3(1)=i_3(2)$ or, $i_3(1)=i_3(2)$.
In an exemplary embodiment, $i_3(1)=i_3(2)=i_3(3)=i_3(4)$.
In an exemplary embodiment, $i_2(1)=i_2(2)$ or, $i_2(1)=i_2(2)$.
In an exemplary embodiment, $i_2(1)=i_2(2)=i_2(3)=i_2(4)$.
In an exemplary embodiment, the M columns of vectors composing the matrix B may be DFT vectors.

According to the device provided by the exemplary embodiments of the present disclosure, the code word may be not only suitable for the correlated channels, but also suitable for the uncorrelated channels. It may be ensured that the code word may achieve a relatively good performance when the $W_1$ is wrongly selected. Furthermore, when the channel changes slowly in a cycle, the code word may still be changed; and thus, the good adaptability may be achieved.

Figure 3:
FIG. 3 is a structural diagram of another device for feeding back CSI in a multi-input multi-output system according to an embodiment of the present disclosure.

As shown in FIG. 3, the embodiments of the disclosure provide a device for feeding back CSI in a multi-input multi-output system. The device may include: a second obtaining module 301 and a second sending module 302.

The second obtaining module 301 may be configured to obtain codebook index information.

The second sending module 302 may be configured to feed back the CSI including the codebook index information to an eNodeB.

The codebook index information may include: a first type of codebook index set I and a second type of codebook index set J. A combination of the first type of index set I and the second type of index set J may be used for indicating a precoding matrix U a union of the first type of index set I and the second type of index set J may include codebook indication information $i_1$, $i_2$ and $i_3$. The precoding matrix may meet a model: $U=W_1 \cdot W_2$, where U is an $N_t \times r$ matrix, $N_t$ represents a total number of ports or a total number of antennas and r represents a number of transmission layers.

The codebook indication information $i_1$ may be used for representing selection information of K matrixes $W_{i,1} L W_{i,k}$, where K may be a positive integer; $i_3$ may be used for representing a matrix w selected from the K matrixes; $i_1$ and $i_3$ may jointly indicate $W_1$ information; $i_2$ may be used for representing $W_2$ information; $i_1$, $i_2$, $i_3$ may jointly determine a precoding code word matrix U.

In an exemplary embodiment, the first type of codebook index set I may at least include $i_1$ and $i_3$ information; the second type of codebook index set J may at least include $i_2$ information.

In an exemplary embodiment, the first type of codebook index set I may at least include $i_1$ and $i_2$ information; the second type of codebook index set J may at least include $i_3$ information.

In an exemplary embodiment, the first type of codebook index set I may at least include $i_1$ information; the second type of codebook index set J may at least include $i_2$ and $i_3$ information.

According to the device provided by the exemplary embodiments of the present disclosure, the code word may be not only suitable for the correlated channels, but also suitable for the uncorrelated channels. It may be ensured that the code word may achieve a relatively good performance when the $W_1$ is wrongly selected. Furthermore, when the channel changes slowly in a cycle, the code word may still be changed; and thus, the good adaptability may be achieved.

It should be appreciated understood by those of ordinary skill in the art that all or some of the acts of the foregoing embodiments may be implemented by a computer program flow. The computer program described above may be stored in a computer-readable storage medium. The computer program is executed on a corresponding hardware platform (such as a system, a device, an apparatus, a component, etc.), and when executed, may include one of the acts of the method embodiment or a combination thereof.

In an exemplary embodiment, all or some of the acts of the foregoing embodiments may also be implemented using an integrated circuit. These acts may be individually manufactured into an integrated circuit module, or multiple modules or acts therein are manufactured into a single integrated circuit module.

Each device/functional module/functional unit in the above embodiments may be implemented using a universal computing device, or may be integrated to a single computing device and may also be distributed on a network consisting of multiple computing devices.

If being implemented in form of a software function module and sold or used as an independent product, each device/functional module/functional unit in the above embodiments may be stored in a computer-readable storage medium. The above-mentioned computer-readable storage medium may be a Read-Only Memory (ROM), a magnetic disk or a compact disc.

INDUSTRIAL APPLICABILITY

In some exemplary embodiments of the present disclosure, the code word may be not only suitable for the correlated channels, but also suitable for the uncorrelated channels. It may be ensured that the code word may achieve a relatively good performance when the $W_1$ is wrongly selected. Furthermore, when the channel changes slowly in a cycle, the code word may still be changed; and thus, good adaptability may be achieved.

What is claimed is:

1. A method for feeding back Channel State Information (CSI) in a multi-input multi-output system, the method comprising:
   feeding back, by a User Equipment (UE), CSI comprising codebook index information to an evolved Node B (eNodeB), wherein
   the codebook index information comprises: a first type of codebook index set I and a second type of codebook index set J; a combination of the first type of index set I and the second type of index set J is used for indicating a precoding matrix U, and the precoding matrix U is an $N_t \times r$ matrix, where $N_t$ represents a total number of ports or a total number of antennas and r represents a number of transmission layers; the precoding matrix U is composed of at least Q×r basic vectors having a dimension of $N_t/Q$, where Q≥2, r≥1, and Q and r are both positive integers; the basic vectors are columns extracted from a matrix B composed of M columns of $N_t/Q$-dimensional vectors, where M is a positive integer;
   a union of the first type of index set I and the second type of index set J comprises codebook indication information $i_1$, $i_2$ and $i_3$;
   the codebook indication information $i_1$ is used for representing selection information of K matrixes $W_{i_11}$ . . . $W_{i_1k}$, where K is a positive integer, each column of the K matrixes $W_{i_11}$ . . . $W_{i_1k}$ is extracted from column vectors comprised in the matrix B; $i_3$ is used for representing a matrix $W_{i_11}$ selected from the K matrixes; $i_2$ is used for representing information of one or more basic vectors extracted from the matrix $W_{i_11}$ and used to construct the precoding matrix U.

2. The method as claimed in claim 1, wherein the precoding matrix U meets a model:

$$U = \begin{bmatrix} v_0 \\ \beta v_1 \end{bmatrix} \text{ or } U = \begin{bmatrix} v'_0 \\ \alpha v'_1 \\ \beta v'_2 \\ \alpha \beta v'_3 \end{bmatrix} \text{ or } U = \begin{bmatrix} v_0 & v_2 \\ \beta v_1 & -\beta v_3 \end{bmatrix} \text{ or}$$

-continued $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

where, vectors $v_0$, $v_1$, $v_2$ and $v_3$ are vectors having a dimension of $N_t/2 \times 1$ vectors $v'_0$, $v'_1$, $v'_2$, $v'_3$, $v'_4$, $v'_5$, $v'_6$ and $v'_7$ are vectors having a dimension of $N_t/4 \times 1$, $\alpha = e^{j\theta_1}$, and $\beta = e^{j\theta_2}$, where $0 \leq \theta_1 \leq 2\pi$, $0 \leq \theta_2 \leq 2\pi$.

3. The method as claimed in claim 2, wherein for the codebook model $$U = \begin{bmatrix} v'_0 \\ \alpha v'_1 \\ \beta v'_2 \\ \alpha\beta v'_3 \end{bmatrix} \text{ or } U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

at least one of the codebook indication information $i_1$, $i_2$ and $i_3$ is further used to represent $\alpha$ information in the codebook model U;
or,
at least one of the codebook indication information $i_1$, $i_2$ and $i_3$ is further used to represent $\beta$ information in the codebook model U.

4. The method as claimed in claim 2, wherein for the model $$U = \begin{bmatrix} v_0 & v_2 \\ \beta v_1 & -\beta v_3 \end{bmatrix},$$

the codebook indication information $i_3$ comprises two pieces of sub-information $i_3(1)$ and $i_3(2)$;
wherein $i_3(1)$ is used for representing information of a matrix $W_{i_1 i_3(1)}$ from which vectors $v_0$ and $v_2$ are extracted; and $i_3(2)$ is used for representing information of a matrix $W_{i_1 i_3(2)}$ from which vectors $v_1$ and $v_3$ are extracted; or,
the $i_3(1)$ is used for representing information of a matrix $W_{i_1 i_3(1)}$ from which vectors $v_0$ and $v_1$ are extracted; and $i_3(2)$ is used for representing information of a matrix $W_{i_1 i_3(2)}$ from which vectors $v_2$ and $v_3$ are extracted;
or,
for the model $$U = \begin{bmatrix} v'_0 \\ \alpha v'_1 \\ \beta v'_2 \\ \alpha\beta v'_3 \end{bmatrix},$$

the codebook indication information $i_3$ comprises two pieces of sub-information $i_3(1)$ and $i_3(2)$;
wherein $i_3(1)$ is used for representing information of a matrix $W_{i_1 i_3(1)}$ from which vectors $v'_0$ and $v'_1$ are extracted; and $i_3(2)$ is used for representing information of a matrix $W_{i_1 i_3(2)}$ from which vectors $v'_2$ and $v'_3$ are extracted; or,
$i_3(1)$ is used for representing information of a matrix $W_{i_1 i_3(1)}$ from which vectors $v'_0$ and $v'_2$ are extracted; and $i_3(2)$ is used for representing information of a matrix $W_{i_1 i_3(2)}$ from which vectors $v'_1$ and $v'_3$ are extracted;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_3$ comprises four pieces of sub-information $i_3(1)$, $i_3(2)$, $i_3(3)$ and $i_3(4)$, wherein $i_3(1)$ is used for representing information of a matrix $W_{i_1 i_3(1)}$ from which vectors $v'_0$ and $v'_4$ are extracted; $i_3(2)$ is used for representing information of a matrix $W_{i_1 i_3(2)}$ from which vectors $v'_1$ and $i'_5$ are extracted; $i_3(3)$ is used for representing information of a matrix $W_{i_1 i_3(3)}$ from which vectors $v'_2$ and $v'_6$ are extracted; $i_3(4)$ is used for representing information of a matrix $W_{i_1 i_3(4)}$ from which vectors $v'_3$ and $v'_7$ are extracted.

5. The method as claimed in claim 4, wherein for the model $$U = \begin{bmatrix} v_0 & v_2 \\ \beta v_1 & -\beta v_3 \end{bmatrix} \text{ or } U = \begin{bmatrix} v'_0 \\ \alpha v'_1 \\ \beta v'_2 \\ \alpha\beta v'_3 \end{bmatrix},$$

$i_3(1) = i_3(2)$; or, for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

$i_3(1) = i_3(2) = i_3(3) = i_4(4)$.

6. The method as claimed in claim 2, wherein for the model $$U = \begin{bmatrix} v'_0 \\ \alpha v'_1 \\ \beta v'_2 \\ \alpha\beta v'_3 \end{bmatrix},$$

the codebook indication information $i_2$ comprises two pieces of sub-information $i_2(1)$ and $i_2(2)$;
wherein $i_2(1)$ is used for representing information of a basic vector extracted from the matrix $W_{i_1 l}$ for vectors $v'_0$ and $v'_1$; $i_2(2)$ is used for representing information of a basic vector extracted from the matrix $W_{i_1 l'}$ for vectors $v'_2$ and $v'_3$; or,
$i_2(1)$ is used for representing information of a basic vector extracted from the matrix $W_{i_1 l}$ for vectors $v'_0$ and $v'_2$; $i_2(2)$ is used for representing information of a basic vector extracted from the matrix $W_{i_1 l'}$ for vectors $v'_1$ and $v'_3$;
or, for the model $$U = \begin{bmatrix} v_0 & v_2 \\ \beta v_1 & -\beta v_3 \end{bmatrix},$$

the codebook indication information $i_2$ comprises two pieces of sub-information $i_2(1)$ and $i_2(2)$;
  wherein $i_2(1)$ is used for representing information of a basic vector extracted from the matrix $W_{i_1 l}$ for vectors $v_0$ and $v_2$; $i_2(2)$ is used for representing information of a basic vector extracted from the matrix $W_{i_1 l'}$ for vectors $v_1$ and $v_3$; or,
  $i_2(1)$ is used for representing information of a basic vector extracted from the matrix $W_{i_1 l}$ for vectors $v_0$ and $v_1$; $i_2(2)$ is used for representing information of a basic vector extracted from the matrix $W_{i_1 l'}$ for vectors $v_2$ and $v_3$;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ comprises four pieces of sub-information $i_2(1)$, $i_2(2)$, $i_2(3)$ and $i_2(4)$;
  wherein $i_2(1)$ is used for representing information of a basic vector extracted from the matrix $W_{i_1 l}$ for vectors $v'_0$ and $v'_4$; $i_2(2)$ is used for representing information of a basic vector extracted from the matrix $W_{i_1 l'}$ for vectors $v'_1$ and $v'_5$; $i_2(3)$ is used for representing information of a basic vector extracted from the matrix $W_{i_1 l''}$ for vectors $v'_2$ and $v'_6$; and $i_2(4)$ is used for representing information of a basic vector extracted from the matrix $W_{i_1 l'''}$ for vectors $v'_3$ and $v'_7$;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ comprises four pieces of sub-information $i_2(1)$, $i_2(2)$, $i_2(3)$ and $i_2(4)$;
  wherein $i_2(1)$ is used for representing information of a basic vector extracted from the matrix $W_{i_1 l}$ for vectors $v'_0$ and $v'_1$; $i_2(2)$ is used for representing information of a basic vector extracted from the matrix $W_{i_1 l'}$ for vectors $v'_2$ and $v'_3$; $i_2(3)$ is used for representing information of a basic vector extracted from the matrix $W_{i_1 l''}$ for vectors $v'_4$ and $v'_5$; and $i_2(4)$ is used for representing information of a basic vector extracted from the matrix $W_{i_1 l'''}$ for vectors $v'_6$ and $v'_7$; or,
  $i_2(1)$ is used for representing information of a basic vector extracted from the matrix $W_{i_1 l}$ for vectors $v'_0$ and $v'_2$; $i_2(2)$ is used for representing information of a basic vector extracted from the matrix $W_{i_1 l'}$ for vectors $v'_1$ and $v'_3$; $i_2(3)$ is used for representing information of a basic vector extracted from the matrix $W_{i_1 l''}$ for vectors $v'_4$ and $v'_6$; and $i_2(4)$ is used for representing information of a basic vector extracted from the matrix $W_{i_1 l'''}$ for vectors $v'_5$ and $v'_7$.

7. The method as claimed in claim 6, wherein for the model $$U = \begin{bmatrix} v'_0 \\ \alpha v'_1 \\ \beta v'_2 \\ \alpha\beta v'_3 \end{bmatrix} \text{ or } U = \begin{bmatrix} v_0 & v_2 \\ \beta v_1 & -\beta v_3 \end{bmatrix},$$

$i_2(1) = i_2(2)$; or, for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

$i_2(1) = i_2(2) = i_2(3) = i_2(4)$.

8. The method as claimed in claim 1, wherein the first type of codebook index set I at least comprises $i_1$ and $i_3$ information; and the second type of codebook index set J at least comprises $i_2$ information; or,
  the first type of codebook index set I at least comprises $i_1$ and $i_2$ information; and the second type of codebook index set J at least comprises $i_3$ information; or,
  the first type of codebook index set I at least comprises $i_1$ information; and the second type of codebook index set J at least comprises $i_2$ and $i_3$ information.

9. The method as claimed in claim 1, wherein the basic vectors composing the precoding matrix U are divided into N1 groups; the codebook indication information $i_3$ comprises N1 pieces of sub-information $i_3(1) \ldots i_3(N1)$ N1≥2 and is a positive integer; wherein $i_3(x)$ is used for representing information of a matrix $W_{i_1 i_x}$ selected for an x th group of vectors from the K matrixes $W_{i_1 1} \ldots W_{i_1 k}$ indicated by $i_1$, where $2 \le x \le N1$.

10. The method as claimed in claim 9, wherein $i_3(1) \ldots i_3(N1)$ have a linear relationship; when the CSI is reported, the UE at least reports one codebook indication information in $i_3(1) \ldots i_3(N1)$.

11. The method as claimed in claim 9, wherein for the model $$U = \begin{bmatrix} v_0 & v_2 \\ \beta v_1 & -\beta v_3 \end{bmatrix},$$

the codebook indication information $i_3$ comprises two pieces of sub-information $i_3(1)$ and $i_3(2)$;
  wherein $i_3(1)$ is used for representing information of a matrix $W_{i_1 i_3(1)}$ from which vectors $v_0$ and $v_2$ are extracted; and $i_3(2)$ is used for representing information of a matrix $W_{i_1 i_3(2)}$ from which vectors $v_1$ and $v_3$ are extracted; or,
  the $i_3(1)$ is used for representing information of a matrix $W_{i_1 i_3(1)}$ from which vectors $v_0$ and $v_1$ are extracted; and $i_3(2)$ is used for representing information of a matrix $W_{i_1 i_3(2)}$ from which vectors $v_2$ and $v_3$ are extracted;
or, for the model $$U = \begin{bmatrix} v'_0 \\ \alpha v'_1 \\ \beta v'_2 \\ \alpha\beta v'_3 \end{bmatrix},$$

the codebook indication information $i_3$ comprises two pieces of sub-information $i_3(1)$ and $i_3(2)$;
    wherein $i_3(1)$ is used for representing information of a matrix $W_{i_1 i_3(1)}$ from which vectors $v'_0$ and $v'_1$ are extracted; and $i_3(2)$ is used for representing information of a matrix $W_{i_1 i_3(2)}$ from which vectors $v'_2$ and $v'_3$ are extracted; or,
    $i_3(1)$ is used for representing information of a matrix $W_{i_1 i_3(1)}$ from which vectors $v'_0$ and $v'_2$ are extracted; and $i_3(2)$ is used for representing information of a matrix $W_{i_1 i_3(2)}$ from which vectors $v'_1$ and $v'_3$ are extracted;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_3$ comprises four pieces of sub-information $i_3(1)$, $i_3(2)$, $i_3(3)$ and $i_3(4)$, wherein $i_3(1)$ is used for representing information of a matrix $W_{i_1 i_3(1)}$ from which vectors $v'_0$ and $v'_4$ are extracted; $i_3(2)$ is used for representing information of a matrix $W_{i_1 i_3(2)}$ from which vectors $v'_1$ and $v'_5$ are extracted; $i_3(3)$ is used for representing information of a matrix $W_{i_1 i_3(3)}$ from which vectors $v'_2$ and $v'_6$ are extracted; $i_3(4)$ is used for representing information of a matrix $W_{i_1 i_3(4)}$ from which vectors $v'_3$ and $v'_7$ are extracted.

12. The method as claimed in claim 1, wherein the basic vectors composing the precoding matrix U are divided into N2 groups; the codebook indication information $i_2$ comprises N2 pieces of sub-information $i_2(1)$ ... $i_2(N2)$ N2≥2; where $i_2(y)$ is used for representing information of one or more basic vectors extracted from a matrix $W_{i_1 l_y}$ jointly indicated by $i_1$ and $i_3$ and used to construct the precoding matrix U, 2≤y≤N2.

13. The method as claimed in claim 12, wherein $i_2(1)$ ... $i_2(N2)$ have a linear relationship; when the CSI is reported, the UE at least reports one codebook indication information in $i_2(1)$ ... $i_2(N2)$.

14. The method as claimed in claim 12, wherein for the model $$U = \begin{bmatrix} v'_0 \\ \alpha v'_1 \\ \beta v'_2 \\ \alpha\beta v'_3 \end{bmatrix},$$

the codebook indication information $i_2$ comprises two pieces of sub-information $i_2(1)$ and $i_2(2)$;
    wherein $i_2(1)$ is used for representing information of a basic vector extracted from the matrix $W_{i_1 l}$ for vectors $v'_0$ and $v'_2$; $i_2(2)$ is used for representing information of a basic vector extracted from the matrix $W_{i_1 l'}$ for vectors $v'_2$ and $v'_3$; or,
    $i_2(1)$ is used for representing information of a basic vector extracted from the matrix $W_{i_1 l}$ for vectors $v'_0$ and $v'_2$; $i_2(2)$ is used for representing information of a basic vector extracted from the matrix $W_{i_1 l'}$ for vectors $v'_1$ and $v'_3$;
or,
for the model $$U = \begin{bmatrix} v_0 & v_2 \\ \beta v_1 & -\beta v_3 \end{bmatrix},$$

the codebook indication information $i_2$ comprises two pieces of sub-information $i_2(1)$ and $i_2(2)$;
    wherein $i_2(1)$ is used for representing information of a basic vector extracted from the matrix $W_{i_1 l}$ for vectors $v_0$ and $v_2$; $i_2(2)$ is used for representing information of a basic vector extracted from the matrix $W_{i_1 l'}$ for vectors $v_1$ and $v_3$; or,
    $i_2(1)$ is used for representing information of a basic vector extracted from the matrix $W_{i_1 l}$ for vectors $v_0$ and $v_1$; $i_2(2)$ is used for representing information of a basic vector extracted from the matrix $W_{i_1 l'}$ for vectors $v_2$ and $v_3$;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ comprises four pieces of sub-information $i_2(1)$, $i_2(2)$, $i_2(3)$ and $i_2(4)$;
    wherein $i_2(1)$ is used for representing information of a basic vector extracted from the matrix $W_{i_1 l}$ for vectors $v'_0$ and $v'_4$; $i_2(2)$ is used for representing information of a basic vector extracted from the matrix $W_{i_1 l'}$ for vectors $v'_1$ and $v'_5$; $i_2(3)$ is used for representing information of a basic vector extracted from the matrix $W_{i_1 l''}$ for vectors $v'_2$ and $v'_6$; and $i_2(4)$ is used for representing information of a basic vector extracted from the matrix $W_{i_1 l'''}$ for vectors $v'_3$ and $v'_7$;
or,
for the model $$U = \begin{bmatrix} v'_0 & v'_4 \\ \alpha v'_1 & \alpha v'_5 \\ \beta v'_2 & -\beta v'_6 \\ \alpha\beta v'_3 & -\alpha\beta v'_7 \end{bmatrix},$$

the codebook indication information $i_2$ comprises four pieces of sub-information $i_2(1)$, $i_2(2)$, $i_2(3)$ and $i_2(4)$;
    wherein $i_2(1)$ is used for representing information of a basic vector extracted from the matrix $W_{i_1 l}$ for vectors $v'_0$ and $v'_1$; $i_2(2)$ is used for representing information of a basic vector extracted from the matrix $W_{i_1 l'}$ for vectors $v'_2$ and $v'_3$, $i_2(3)$ is used for representing information of a basic vector extracted from the matrix $W_{i_1l''}$ for vectors $v'_4$ and $v'_5$; and $i_2(4)$ is used for representing information of a basic vector extracted from the matrix $W_{i_1l'''}$ for vectors $v'_6$ and $v'_7$; or, $i_2(1)$ is used for representing information of a basic vector extracted from the matrix $W_{i_1l}$ for vectors $v'_0$ and $v'_2$; $i_2(2)$ is used for representing information of a basic vector extracted from the matrix $W_{i_1l'}$ for vectors $v'_1$ and $v'_3$; $i_2(3)$ is used for representing information of a basic vector extracted from the matrix $W_{i_1l''}$ for vectors $v'_4$ and $v'_6$; and $i_2(4)$ is used for representing information of a basic vector extracted from the matrix $W_{i_1l'''}$ for vectors $v'_5$ and $v'_7$.

15. The method as claimed in claim 1, where M columns of vectors composing the matrix B are Discrete Fourier Transformation (DFT) vectors.

16. A method for feeding back Channel State Information (CSI) in a multi-input multi-output system, the method comprising:

feeding back, by a User Equipment (UE), CSI comprising codebook index information to an evolved Node B (eNodeB), wherein the codebook index information comprises: a first type of codebook index set I and a second type of codebook index set J; a combination of the first type of index set I and the second type of index set J is used for indicating a precoding matrix U; a union of the first type of index set I and the second type of index set J comprises codebook indication information $i_1$, $i_2$ and $i_3$; the precoding matrix meets a model: $U=W_1 \cdot W_2$, wherein U is an $N_t \times r$ matrix, $N_t$ represents a total number of ports or a total number of antennas and r represents a number of transmission layers;

the codebook indication information $i_1$ is used for representing selection information of K matrixes $W_{i_1 1}$ ... $W_{i_1 k}$, where K is a positive integer; $i_3$ is used for representing a matrix $W_{i_1 l}$ selected from the K matrixes; $i_1$, and $i_3$ jointly indicate $W_1$ information; $i_2$ is used for representing $W_2$ information; the $i_1$, $i_2$ and $i_3$ jointly determine a precoding code word matrix U.

17. The method as claimed in claim 16, wherein the first type of codebook index set I at least comprises $i_1$ and $i_3$ information; the second type of codebook index set J at least comprises $i_2$ information; or, the first type of codebook index set I at least comprises $i_1$ and $i_2$ information; the second type of codebook index set J at least comprises $i_3$ information; or, the first type of codebook index set I at least comprises $i_1$ information; the second type of codebook index set J at least comprises $i_2$ and $i_3$ information.

18. A device for feeding back Channel State Information (CSI) in a multi-input multi-output system, the device comprising:

a first obtaining module, configured to obtain codebook index information; and a first sending module, configured to feed back the CSI comprising the codebook index information to an evolved Node B (eNodeB), wherein the codebook index information comprises: a first type of codebook index set I and a second type of codebook index set J; a combination of the first type of index set I and the second type of index set J is used for indicating a precoding matrix U, and the precoding matrix U is an $N_t \times r$ matrix, where $N_t$ represents a total number of ports or a total number of antennas and r represents a number of transmission layers; the precoding matrix U is composed of at least $Q \times r$ basic vectors having a dimension of $N_t/Q$, where $Q \geq 2$, $r \geq 1$, and Q and r are both positive integers; the basic vectors are columns extracted from a matrix B composed of M columns of $N_t/Q$-dimensional vectors, where M is a positive integer;

a union of the first type of index set I and the second type of index set J at least comprises codebook indication information $i_1$, $i_2$ and $i_3$;

the codebook indication information $i_1$ is used for representing selection information of K matrixes $W_{i_1 1}$ ... $W_{i_1 k}$, where K is a positive integer, each column of the K matrixes $W_{i_1 1}$ ... $W_{i_1 k}$ is extracted from column vectors comprised in the matrix B; $i_3$ is used for representing a matrix $W_{i_1 l}$ selected from the K matrixes; $i_2$ is used for representing information of one or more basic vectors extracted from the matrix $W_{i_1 l}$ and used to construct the precoding matrix U.

19. A device for feeding back Channel State Information (CSI) in a multi-input multi-output system, the device comprising:

an obtaining module, configured to obtain codebook index information; and a sending module, configured to feed back the CSI comprising the codebook index information to an evolved Node B (eNodeB), wherein the codebook index information comprises: a first type of codebook index set I and a second type of codebook index set J; a combination of the first type of index set I and the second type of index set J is used for indicating a precoding matrix U; a union of the first type of index set I and the second type of index set J comprises codebook indication information $i_1$, $i_2$ and $i_3$; the precoding matrix meets a model: $U=W_1 \cdot W_2$, wherein U is an $N_t \times r$ matrix, $N_t$ represents a total number of ports or a total number of antennas and r represents a number of transmission layers;

the codebook indication information $i_1$ is used for representing selection information of K matrixes $W_{i_1 1}$ ... $W_{i_1 k}$, where K is a positive integer; $i_3$ is used for representing a matrix $W_{i_1 l}$ selected from the K matrixes; $i_1$ and $i_3$ jointly indicate $W_1$ information; $i_2$ is used for representing $W_2$ information; $i_1$, $i_2$ and $i_3$ jointly determine a precoding code word matrix U.

20. A non-transitory computer readable storage medium, which stores a computer executable instruction, wherein the computer executable instruction is used to implement the method as claimed in claim 1.

* * * * *